(12) United States Patent
Takamori et al.

(10) Patent No.: US 12,535,337 B2
(45) Date of Patent: Jan. 27, 2026

(54) DETECTION DEVICE AND OPERATION DEVICE

(71) Applicant: OMRON Corporation, Kyoto (JP)

(72) Inventors: Satoshi Takamori, Kyoto (JP); Koichi Furusawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 286 days.

(21) Appl. No.: 18/271,670

(22) PCT Filed: Jan. 28, 2022

(86) PCT No.: PCT/JP2022/003364
§ 371 (c)(1),
(2) Date: Jul. 11, 2023

(87) PCT Pub. No.: WO2022/168758
PCT Pub. Date: Aug. 11, 2022

(65) Prior Publication Data
US 2024/0060797 A1 Feb. 22, 2024

(30) Foreign Application Priority Data
Feb. 4, 2021 (JP) .................. 2021-016464

(51) Int. Cl.
G01D 5/12 (2006.01)
G01D 5/14 (2006.01)
(Continued)

(52) U.S. Cl.
CPC ............ *G01D 5/145* (2013.01); *G05G 1/015* (2013.01); *G05G 9/047* (2013.01); *G06F 3/0338* (2013.01); *A63F 13/24* (2014.09); *H01H 25/04* (2013.01)

(58) Field of Classification Search
CPC ........ G01D 5/145; G05G 1/015; G05G 9/047; G06F 3/0338
See application file for complete search history.

(56) References Cited

U.S. PATENT DOCUMENTS

2012/0025809 A1* 2/2012 Banerjee .................. G05G 7/02
324/207.13

FOREIGN PATENT DOCUMENTS

| JP | S5865729 | 5/1983 |
| TW | 371503 | 10/1999 |
| WO | 2019169086 | 9/2019 |

OTHER PUBLICATIONS

"International Search Report (Form PCT/ISA/210) of PCT/JP2022/003364", mailed on Apr. 5, 2022, with English translation thereof, pp. 1-4.

(Continued)

*Primary Examiner* — Alesa Allgood
(74) *Attorney, Agent, or Firm* — JCIPRNET

(57) ABSTRACT

An operation device receives an operation from outside via an operation part. A detection device incorporated in the operation part detects an action of a shaft member acting in response to the operation from outside. The shaft member is inserted through a hollow spherical body having an outer shape formed in a substantially spherical shape. The spherical body includes therein a magnet (first magnet and second magnet fixed at a position linked with the action of the shaft member, and a magnetic field detection unit fixed at a fixed position in the vicinity of a center and having a first magnetic field sensor and a second magnetic field sensor detecting a magnetic field formed by the magnet.

13 Claims, 39 Drawing Sheets

(51) Int. Cl.
*G05G 1/015* (2008.04)
*G05G 9/047* (2006.01)
*G06F 3/0338* (2013.01)
*A63F 13/24* (2014.01)
*H01H 25/04* (2006.01)

(56) References Cited

OTHER PUBLICATIONS

"Written Opinion of the International Searching Authority (Form PCT/ISA/237) of PPCT/JP2022/003364", mailed on Apr. 5, 2022, with English translation thereof, pp. 1-6.

* cited by examiner

| Di | 0 | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 | 125 |
|---|---|---|---|---|---|---|---|---|---|---|---|---|---|---|---|---|---|---|---|---|---|---|---|---|---|---|
| Do | 4.1 | 9.0 | 13.8 | 18.4 | 23.0 | 27.5 | 31.9 | 36.3 | 40.7 | 45.0 | 49.3 | 53.7 | 58.1 | 62.5 | 67.0 | 71.6 | 76.2 | 81.0 | 85.9 | 90.9 | 96.0 | 101.3 | 106.7 | 112.2 | 117.8 | 123.5 |

FIG.47

DETECTION DEVICE AND OPERATION DEVICE

CROSS-REFERENCE TO RELATED APPLICATION

This application is a 371 application of the International PCT application serial no. PCT/JP2022/003364, filed on Jan. 28, 2022, which claims the priority benefits of Japan Patent Application No. 2021-016464, filed on Feb. 4, 2021. The entirety of each of the above-mentioned patent applications is hereby incorporated by reference herein and made a part of this specification.

TECHNICAL FIELD

The present invention relates to a detection device that detects an action of a shaft member acting in response to an operation from outside, and an operation device including such a detection device.

RELATED ART

As an operation device for operating various devices such as computer games, various toys, and industrial robots, an operation device called a joystick has become widespread. In an operation device in the form called a joystick, by tilting the stick in various directions, an operation target acts in the tilting direction, which makes intuitive operation possible. As such an operation device, for example, Patent Document 1 has proposed a variable resistance type pointing device that detects an inclination by variable resistors arranged on XY axes.

RELATED ART DOCUMENTS

Patent Documents

Patent Document 1: Taiwan Utility Model Publication No. 371503

SUMMARY OF INVENTION

Problem to Be Solved by Invention

However, in the variable resistance type pointing device described in Patent Document 1, there is a problem that the sliding portion of the variable resistor is easily degraded by friction, which results in low reliability.

The present invention has been made in view of such circumstances, and a main objective thereof is to provide a detection device capable of improving reliability.

Further, another objective of the present invention is to provide an operation device including such a detection device.

Means for Solving Problem

To solve the above problem, a detection device according to the present application is a detection device which detects an action of a shaft member acting in response to an operation from outside, and includes: a spherical body which has an outer shape formed in a substantially spherical shape and through which the shaft member is inserted; a magnet; and a magnetic field detection unit which detects a magnetic field formed by the magnet. One of the magnet and the magnetic field detection unit is fixed at a position affected by the action of the shaft member, and the other of the magnet and the magnetic field detection unit is fixed at a fixed position not affected by the action of the shaft member.

Further, the detection device according to the present application includes: a hollow spherical body which has an outer shape formed in a substantially spherical shape and through which the shaft member is inserted; a magnet which is fixed inside the spherical body at a position linked with the action of the shaft member; and a magnetic field detection unit which is fixed at a position in the vicinity of a center of the spherical body and detects a magnetic field formed by the magnet.

Further, in the detection device, the shaft member acts with respect to a virtual central axis which is parallel to a longitudinal direction and passes through the center of the spherical body. The inside of the spherical body is divided into a first magnetic field chamber and a second magnetic field chamber arranged in a central axis direction. The magnet includes: a first magnet which is fixed to the shaft member inserted into the first magnetic field chamber; and a second magnet which is fixed in the second magnetic field chamber. The magnetic field detection unit includes: a first magnetic field sensor which detects a magnetic field in the first magnetic field chamber; and a second magnetic field sensor which detects a magnetic field in the second magnetic field chamber.

Further, the detection device includes a magnetic shielding plate arranged at a position forming a boundary between the first magnetic field chamber and the second magnetic field chamber.

Further, the detection device includes at least one of a first spacer member which spaces apart the magnetic shielding plate and the first magnetic field sensor, and a second spacer member which spaces apart the magnetic shielding plate and the second magnetic field sensor.

Further, in the detection device, the first magnet is arranged such that magnetic poles of the first magnet face a direction perpendicular to the central axis. The second magnet is arranged such that magnetic poles of the second magnet face a direction parallel to the central axis.

Further, in the detection device, the action of the shaft member is at least one action among an action in which the central axis tilts with the center of the spherical body as a fulcrum, an action of rotating in a circumferential direction around the central axis, and an action of moving in an extending direction of the central axis.

Further, in the detection device, the shaft member is capable of acting at least in an extending direction of the central axis. The spherical body acts in the extending direction in conjunction with the action of the shaft member in the extending direction. The detection device includes: a movable member which moves in conjunction with an action of the spherical body in the extending direction; a fixed member which holds the movable member with the movable member being capable of acting; and a pressure sensor which is fixed to the fixed member and detects a pressing based on movement of the movable member.

Further, the detection device includes, as the pressure sensor or separately from the pressure sensor, a tactile switch which receives the pressing based on the movement of the movable member.

Further, in the detection device, the shaft member is capable of acting at least in an extending direction of the central axis. The spherical body acts in the extending direction in conjunction with the action of the shaft member in the extending direction. The detection device includes: a movable member which moves in conjunction with an action of the spherical body in an axial direction; a fixed member which holds the movable member with the movable member being capable of acting; a third magnet which is fixed to the movable member; and a third magnetic field sensor which is fixed to the fixed member.

Further, the detection device includes a connection line attached to the magnetic field detection unit. An opening through which the connection line is passed inside and outside is provided at the spherical body. The opening is formed in an elongated shape along a large circle passing through intersections between the spherical body and the central axis.

Further, an operation device according to the present application includes: the detection device described above; and an operation part which receives an operation causing the spherical body included in the detection device to act.

Further, in the operation device, the action of the shaft member includes an action in which the central axis tilts with the center of the spherical body as a fulcrum, and an action of rotating in a circumferential direction around the central axis. The operation device includes a device which corrects a detected value of a rotation action based on a detected value of a tilting action.

Further, in the operation device, the action of the shaft member includes an action in which the central axis tilts with the center of the spherical body as a fulcrum, and an action of rotating in a circumferential direction around the central axis. The operation device includes a device which corrects a detected value of a tilting action based on a detected value of a rotation action.

The detection device and the operation device according to the present application detect the action of the shaft member with the magnet and the magnetic field detection unit.

Effects of Invention

The detection device and the operation device according to the present invention detect the action of the shaft member acting in response to an operation from outside with the magnet and the magnetic field detection unit. Thus, for example, it is not required to use a sliding variable resistor for detecting actions. Accordingly, excellent effects such as being capable of suppressing frictional degradation and improving reliability are achieved.

BRIEF DESCRIPTION OF DRAWINGS

FIG. 47 is a chart comparing and showing an example of the difference due to tilting in the detected value of the angle of magnetic lines of force (magnetic pole vector) detected by the first magnetic field sensor included in the detection device according to the present application.

DESCRIPTION OF EMBODIMENTS

Hereinafter, embodiments of the present invention will be described with reference to the drawings. An operation device according to the present application may be used, for example, as a joystick-type controller for operating an operation target. Further, a detection device according to the present application is incorporated in the operation device, which is a joystick-type controller, and detects an action of a member based on the operation. Used as an operation device such as a joystick-type controller, the operation device according to the present application may be used in the operation of various operation targets such as operation devices for computer games, as well as various toys, various moving bodies, various measuring devices, and industrial robots. Hereinafter, with reference to the drawings, an operation device 1 in which the operation device according to the present application is applied as a joystick-type controller, and a detection device 2 incorporated in the operation device 1 will be illustrated and described.

First Embodiment

<Operation Device 1>

Figure 1:
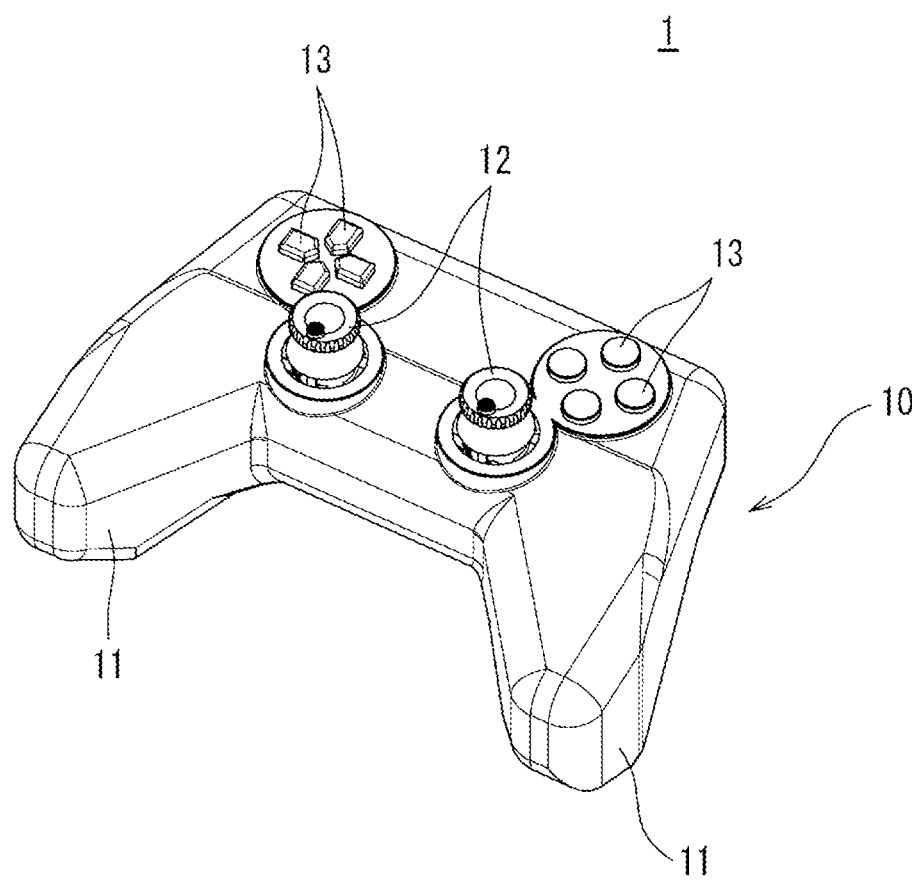
FIG. 1 is a schematic perspective view showing an example of the appearance of an operation device according to the present application.

FIG. 1 is a schematic perspective view showing an example of the appearance of an operation device 1 according to the present application. The operation device 1 includes a housing 10, and gripping parts 11 for gripping respectively with the right hand and the left hand are formed at two ends of the housing 10. In the case where the gripping parts 11 at the two ends are respectively gripped, positions with which the fingers on the upper surface come into contact are formed with substantially circular openings, and through the openings, an operation part 12 for operating an operation target protrudes from inside the housing 10. The operation part 12 is attached to a shaft member 20 (to be described later; see FIG. 3 and other figures) included in a detection device 2 incorporated inside the operation device 1. Furthermore, on the upper surface side, a plurality of operation buttons 13 are arranged at positions capable of being pressed by the fingers of an operator. In the operation device 1 illustrated in FIG. 1, two detection devices 2 including a detection device 2 detecting an action based on the operation of the right hand and a detection device 2 detecting an action based on the operation of the left hand are incorporated in one housing 10. In the present application, for convenience of illustration, the side positioned above in the case where an operator operates in a general posture, i.e., the side on which the operation buttons 13 are arranged and the operation part 12 protrudes, will be described as the upper side.

Figure 2:
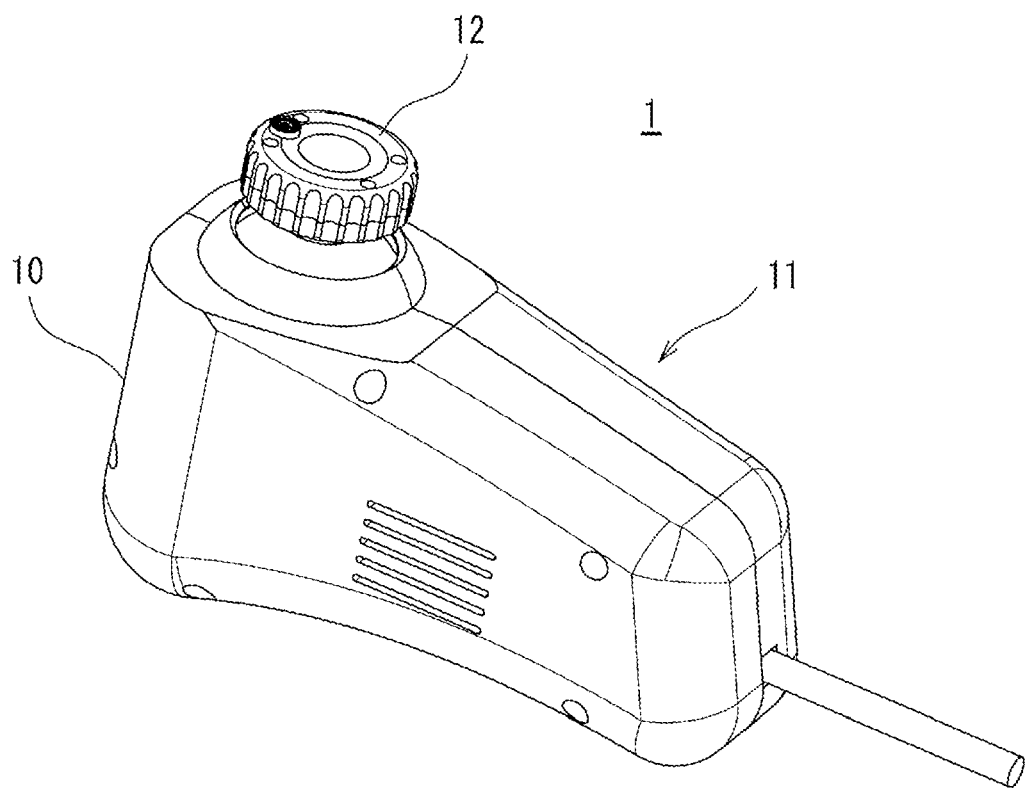
FIG. 2 is a schematic perspective view showing an example of the appearance of the operation device according to the present application.

FIG. 2 is a schematic perspective view showing an example of the appearance of the operation device 1 according to the present application. FIG. 2 shows another embodiment of the operation device 1. The operation device 1 illustrated in FIG. 2 incorporates various mechanisms such as one detection device 2 in one housing 10 and is formed as a controller for one-handed operation. For example, in the case of applying as a controller of an industrial robot, the operation device 1 according to the present invention may be operated with one hand and another task may be performed with the other hand, so such an embodiment is particularly effective. Further, it is also effective as a controller for a game in which different operation devices 1 are gripped with the left hand and the right hand.

<Detection Device 2>
<Structure>

Figure 3:
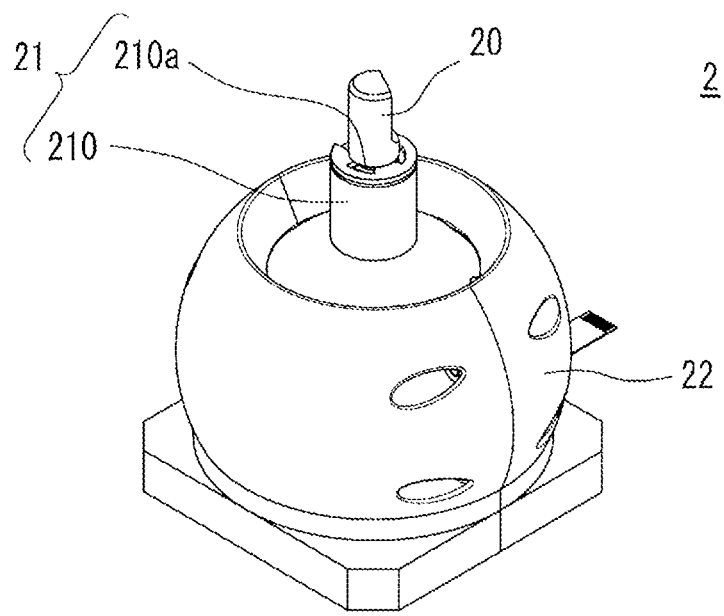
FIG. 3 is a schematic perspective view showing an example of a detection device according to the present application.

FIG. 3 is a schematic perspective view showing an example of the detection device 2 according to the present application. FIG. 3 shows the detection device 2 incorporated in the operation device 1 according to the present application. The detection device 2 includes a shaft member 20 to which the operation part 12 is attached, and the shaft member 20 acts in response to an operation of the operator. The shaft member 20 is inserted through a hollow spherical body 21 having an outer shape formed into a substantially spherical shape. An insertion part 210 in a substantially cylindrical shape through which the shaft member 20 is inserted is formed at the upper end of the spherical body 21, and the shaft member 20 has an elongated rod shape and is inserted through an insertion hole 210a opened at the center of the insertion part 210 into the inside of the spherical body 21. The spherical body 21 is held by a holding member 22 while being capable of acting. The inner surface of the holding member 22 is formed into a spherical shape conforming to the outer shape of the spherical body 21, and a protection part 220 (to be described later; see FIG. 6 and other figures) extends to the inner side. The protection part 220 protects a first connection line 230.

The action of the shaft member 20 based on the operation of the operator is an action with respect to a virtual central axis that is parallel to the longitudinal direction and passes through the center of the spherical body 21. Specifically, the action of the shaft member 20 includes an action in which the central axis tilts with the center of the spherical body 21 as a fulcrum, an action of rotating in a circumferential direction around the central axis, and an action of moving in the up-down direction (extending direction of the central axis). In the case where the shaft member 20 performs a tilting action, the spherical body 21 performs a tilting action with the center as a fulcrum in conjunction with the action of the shaft member 20. In the case where the shaft member 20 performs an up-down moving action, the spherical body 21 performs an up-down moving action in conjunction with the action of the shaft member 20. The spherical body 21 does not act in conjunction with the rotation action of the shaft member 20. The first embodiment illustrates an embodiment in which the shaft member 20 performs a tilting action and a rotation action but does not perform an up-down moving action. Reference is made to other embodiments such as a third embodiment for the up-down moving action.

Figure 4:
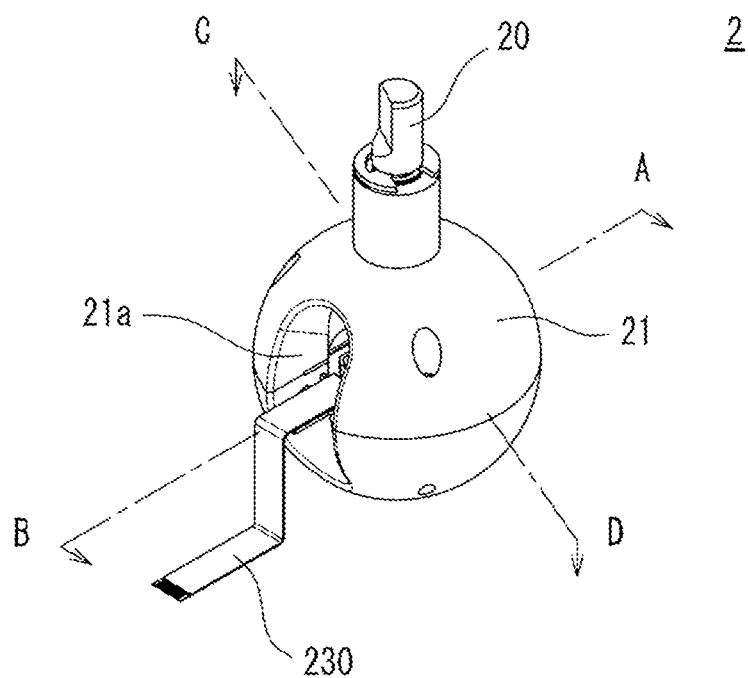
FIG. 4 is a schematic perspective view showing an example of the detection device according to the present application.

FIG. 4 is a schematic perspective view showing an example of the detection device 2 according to the present application. FIG. 4 shows a state in which the holding member 22 is removed from the detection device 2 illustrated in FIG. 3. A magnetic field detection unit 23 to be described later is arranged inside the spherical body 21, and a first connection line 230 serving as a medium for conducting electricity is connected to the magnetic field detection unit 23. An opening 21a through which the first connection line 230 passes is provided at the lateral surface of the spherical body 21, and the first connection line 230 is extended to the outside through the opening 21a. The opening 21a is formed in an elongated shape extending vertically along a large circle passing through the upper and lower intersections between the spherical body 21 and the central axis. The first connection line 230 is covered by the protection part 220 (not shown in FIG. 4; see FIG. 6 and other figures) formed on the inner surface of the holding member 22 and extending to the inner side, and is extended from the inside to the outside of the spherical body 21. Although the position of the first connection line 230 covered by the protection part 220 is fixed, with the opening 21a formed at the spherical body 21, even if the spherical body 21 performs a tilting action or an up-down moving action, the spherical body 21 does not interfere with the first connection line 230. The spherical body 21 acting in conjunction with the shaft member 20 which tilts in various directions performs a tilting action in various directions (all directions at 360 degrees in a plan view), but in the case of tilting in any direction, the spherical body 21 does not interfere with the first connection line 230.

Figure 5:
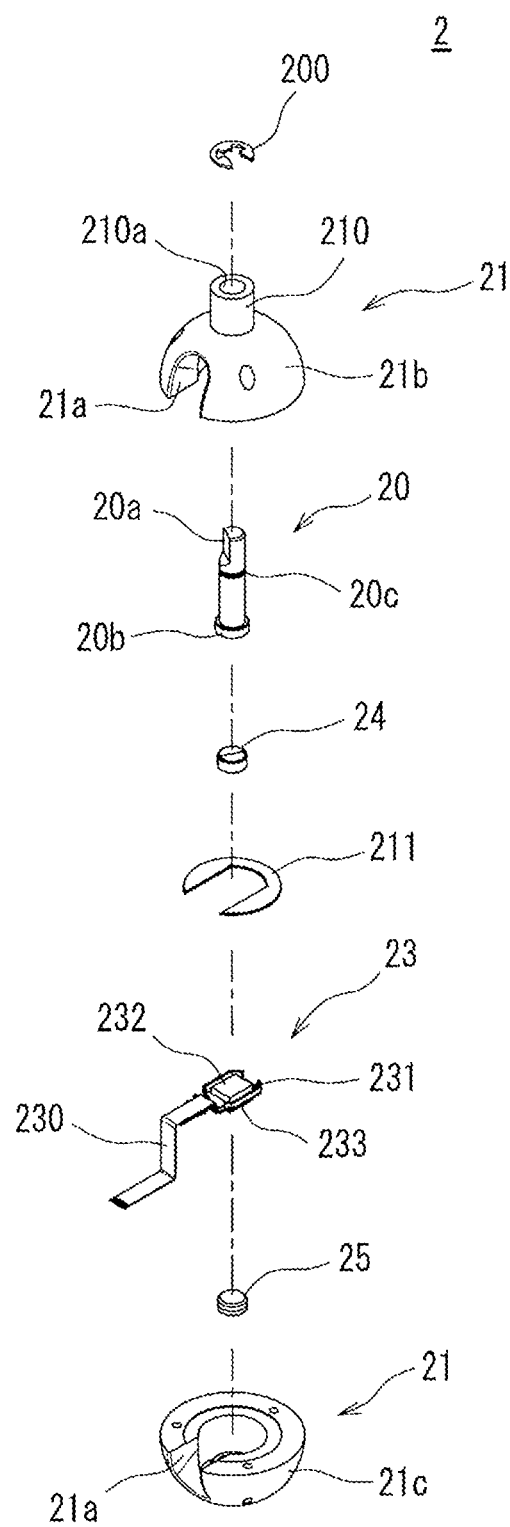
FIG. 5 is a schematic exploded perspective view showing an example of the detection device according to the present application.
Figure 6:
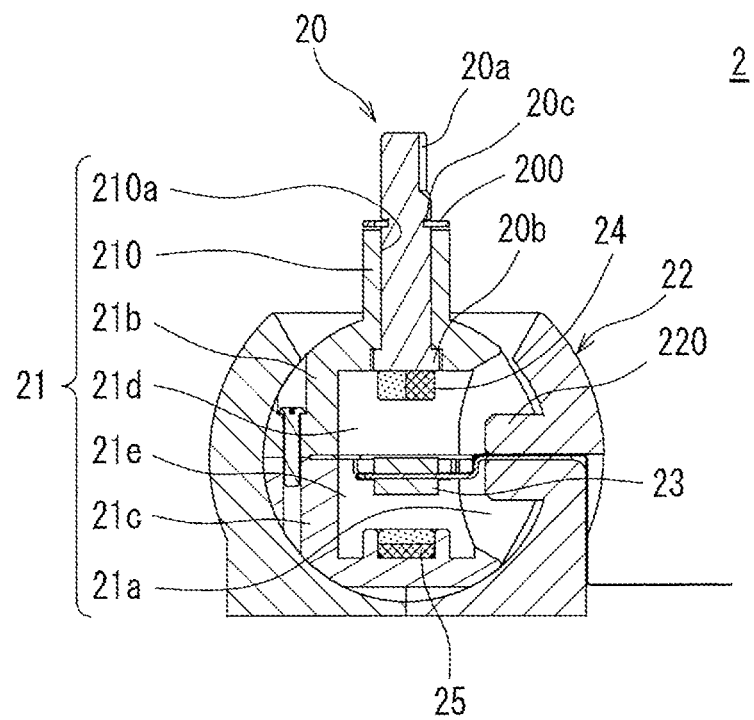
FIG. 6 is a schematic cross-sectional view showing an example of the detection device according to the present application.

FIG. 5 is a schematic exploded perspective view showing an example of the detection device 2 according to the present application. FIG. 6 is a schematic cross-sectional view showing an example of the detection device 2 according to the present application. FIG. 5 shows the spherical body 21 included in the detection device 2 and various members accommodated inside the spherical body 21. FIG. 6 shows a schematic cross-sectional view of an internal structure of the detection device 2 cut by a vertical plane passing through A-B shown in FIG. 4. As described above, the inside of the spherical body 21 included in the detection device 2 is hollow. The spherical body 21 is assembled by fixing an upper half body 21b and a lower half body 21c according to a method such as screwing. The inside of the spherical body 21 is divided by the magnetic field detection unit 23 and a central magnetic shielding plate 231 into upper and lower parts, i.e., a first magnetic field chamber 21d which is the space in the upper half body 21b and a second magnetic field chamber 21e which is the space in the lower half body 21c.

The magnetic field detection unit 23 is fixed at a fixed position in the vicinity of the approximate center in the spherical body 21. The first connection line 230 is connected to the magnetic field detection unit 23, and the first connection line 230 extends to the outside of the spherical body 21.

The shaft member 20 inserted through the insertion part 210 of the spherical body 21 has an elongated rod shape and is inserted through the insertion part 210 such that the longitudinal direction is the up-down direction. The upper part of the shaft member 20 forms an attachment part 20a processed into a shape capable of attaching the operation part 12. The edge of the lower end of the shaft member 20 is positioned in the vicinity of the inner surface of the spherical body 21 as a flange part 20b in a shape protruding in the radial direction. The flange part 20b at the lower end of the shaft member 20 is loosely fitted into a cylindrical recess formed at the top surface in the spherical body 21 with slight play. A fitting groove 20c is engraved in the circumferential direction in the vicinity of the center of the shaft member 20, and a metal-made fastener 200 having a substantially U-shape is fitted into the fitting groove 20c. The flange part 20b at the lower end of the shaft member 20 is loosely fitted into the recess in the spherical body 21 to restrict upward movement, and the fastener 200 in the vicinity of the center of the shaft member 20 abuts against the upper end of the insertion part 210 of the spherical body 21 to restrict downward movement. Since the shaft member 20 is inserted through the spherical body 21, in the detection device 2, upon tilting of the shaft member 20, the spherical body 21 also tilts conjunctively. Since the protection part 220 of the holding member 22 is inserted through the opening 21a of the spherical body 21, even if the shaft member 20 rotates in the circumferential direction, the spherical body 21 does not act conjunctively.

A first magnet 24 using a permanent magnet having a substantially cylindrical shape is fixed at the lower end of the shaft member 20, which is positioned in the vicinity of the inner surface of the first magnetic field chamber 21d of the spherical body 21. The first magnet 24 is arranged such that its magnetic poles face a direction perpendicular to the central axis. A second magnet 25 using a permanent magnet having a substantially cylindrical shape is fixed at a position intersecting with the central axis in the vicinity of the inner surface of the second magnetic field chamber 21e of the spherical body 21. The second magnet 25 is arranged such that its magnetic poles face a direction parallel to the central axis. In the present application, the direction of the magnetic poles refers to a direction connecting the two magnetic poles. Thus, for example, the arrangement of the first magnet 24 may be illustrated as being fixed such that the N pole faces a horizontal first direction (e.g., left), and the S pole faces a horizontal second direction (e.g., right) opposite to the first direction. Further, for example, the arrangement of the second magnet 25 may be illustrated as being fixed such that the N pole faces upward and the S pole faces downward.

A lateral magnetic shielding plate 211 that shields a magnetic field is arranged at a position forming a boundary between the first magnetic field chamber 21d and the second magnetic field chamber 21e of the spherical body 21 to surround the lateral side of the magnetic field detection unit 23, and the inside of the spherical body 21 is divided into the first magnetic field chamber 21d and the second magnetic field chamber 21e by the lateral magnetic shielding plate 211. The lateral magnetic shielding plate 211 has an outer shape that forms a substantially disk shape conforming to the shape in the spherical body 21, and a notch for arranging the magnetic field detection unit 23 is formed on the inner side.

Figure 7:
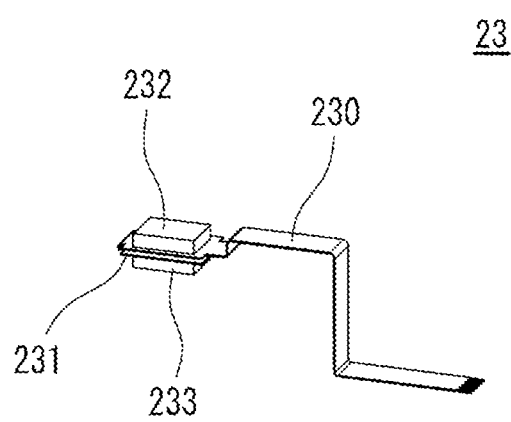
FIG. 7 is a schematic perspective view showing an example of a magnetic field detection unit included in the detection device according to the present application.

FIG. 7 is a schematic perspective view showing an example of the magnetic field detection unit 23 included in the detection device 2 according to the present application. The magnetic field detection unit 23 will be further described. The magnetic field detection unit 23 is fixed at a fixed position in the vicinity of the center in the spherical body 21. The magnetic field detection unit 23 is arranged at a position forming the boundary between the first magnetic field chamber 21d and the second magnetic field chamber 21e of the spherical body 21, and includes a central magnetic shielding plate 231 that shields a magnetic field. The central magnetic shielding plate 231 has a flat plate shape and has an upper surface facing the first magnetic field chamber 21d and a lower surface facing the second magnetic field chamber 21e.

The first connection line 230 extending into the spherical body 21 through the opening 21a is fixed to the upper surface of the central magnetic shielding plate 231, and further, the tip side is wound around and fixed to the lower surface of the central magnetic shielding plate 231. A first magnetic field sensor 232 is arranged on the upper surface of the central magnetic shielding plate 231 with the first connection line 230 interposed therebetween. A second magnetic field sensor 233 is arranged on the lower surface of the central magnetic shielding plate 231 with the first connection line 230 interposed therebetween. The first magnetic field sensor 232 and the second magnetic field sensor 233 are wired to be electrically connected to the first connection line 230.

The first magnetic field sensor 232 and the second magnetic field sensor 233 are electronic components such as Hall ICs that detect a magnetic field and output an electrical signal based on the detected magnetic field. The first magnetic field sensor 232 detects a magnetic field generated by the first magnet 24 on the first magnetic field chamber 21d side. The second magnetic field sensor 233 detects a magnetic field generated by the second magnet 25 on the second magnetic field chamber 21e side. The magnetic fields detected by the first magnetic field sensor 232 and the second magnetic field sensor 233 are outputted as electrical signals to the outside via the first connection line 230.

Figure 8:
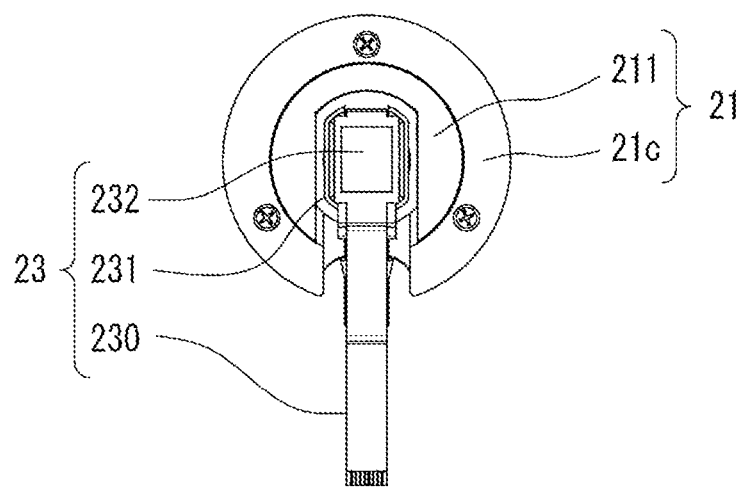
FIG. 8 is a schematic cross-sectional view showing an example of the detection device according to the present application.

FIG. 8 is a schematic cross-sectional view showing an example of the detection device 2 according to the present application. FIG. 8 shows a schematic cross-sectional view viewed from above of an internal structure cut by a horizontal plane passing through C-D in FIG. 4. In the case where the spherical body 21 has a posture that is not tilted, the lateral magnetic shielding plate 211 and the central magnetic shielding plate 231 form a horizontal plane that divides the first magnetic field chamber 21d and the second magnetic field chamber 21e. By shielding the magnetic field at the horizontal plane formed by the lateral magnetic shielding plate 211 and the central magnetic shielding plate 231, adverse effects due to interference between the magnetic field of the first magnetic field chamber 21d generated by the first magnet 24 and the magnetic field of the second magnetic field chamber 21e generated by the second magnet 25 are prevented. By configuring the lateral magnetic shielding plate 211 and the central magnetic shielding plate 231 as different members, effects such as improved assemblability and improved magnetic shielding are achieved compared to the case of configuring them as one member.

<Assembly Method>

Figure 9:
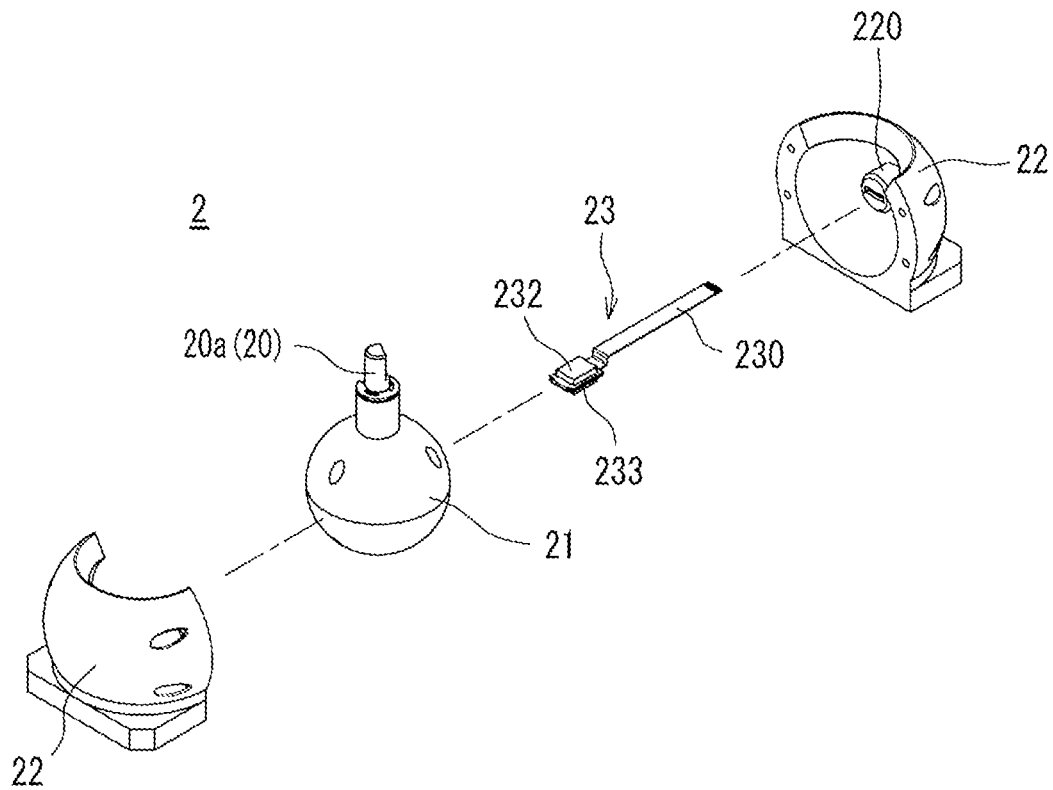
FIG. 9 is a schematic view conceptually illustrating an example of an assembly method of the detection device according to the present application.
Figure 10:
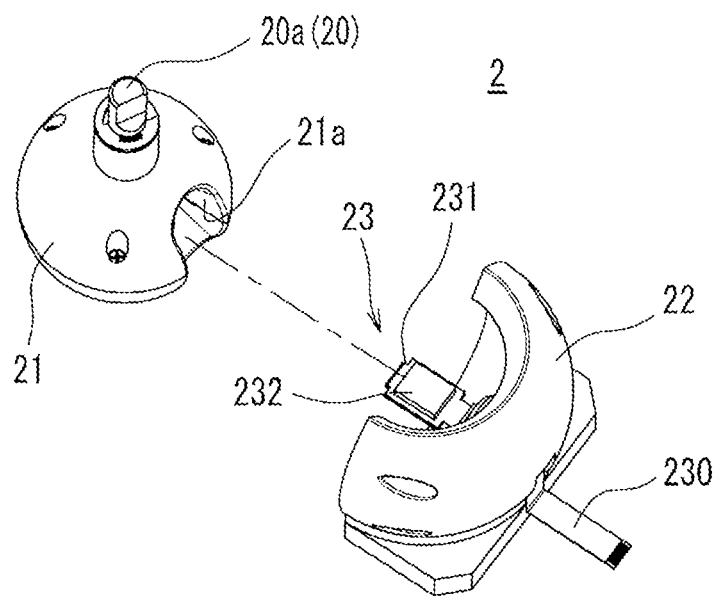
FIG. 10 is a schematic view conceptually illustrating an example of the assembly method of the detection device according to the present application.

Next, an assembly method of the detection device 2 will be generally described. FIG. 9 and FIG. 10 are schematic views conceptually illustrating an example of the assembly method of the detection device 2 according to the present application. FIG. 9 is a perspective view showing a relative positional relationship of the spherical body 21, the holding member 22, and the magnetic field detection unit 23 among the members constituting the detection device 2 according to the present application. FIG. 10 is a perspective view showing a relative positional relationship of the spherical body 21, a part of the holding member 22, and the magnetic field detection unit 23. In FIG. 10, the holding member 22 is shown in a state divided into two parts before assembly. First, as illustrated in FIG. 9, the first connection line 230 of the magnetic field detection unit 23 is inserted into the protection part 220 of the holding member 22 from the inner side. Next, as illustrated in FIG. 10, the first magnetic field sensor 232 and the second magnetic field sensor 233 of the magnetic field detection unit 23 are inserted from the opening 21*a* of the spherical body 21 and fixed at a fixed position in the vicinity of the center in the spherical body 21. Then, by combining the divided holding member 22 to operably hold the spherical body 21 and attaching the operation part 12 (not shown) to the attachment part 20*a* of the shaft member 20, the detection device 2 is completed.

<Detection Method>

Figure 11:
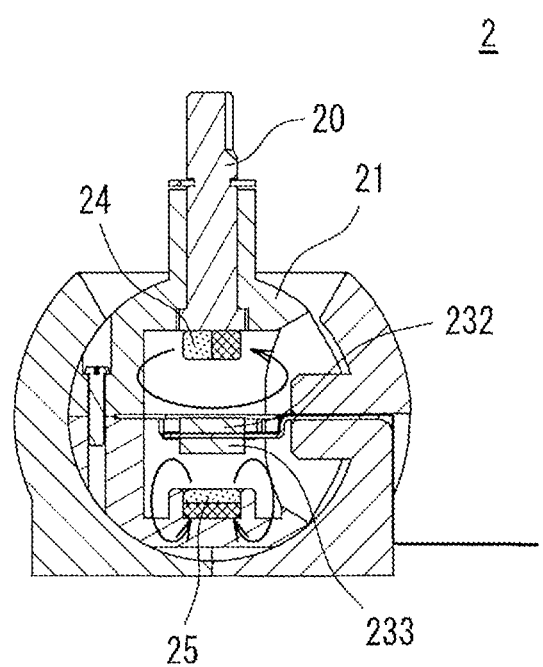
FIG. 11 is a schematic cross-sectional view showing an example of the detection device according to the present application.

Next, a detection method of an action of the shaft member 20 by the detection device 2 will be described. FIG. 11 is a schematic cross-sectional view showing an example of the detection device 2 according to the present application. FIG. 11 shows a state in which the shaft member 20 of the detection device 2 is at a reference position. The reference position of the shaft member 20 is a position at which the operation device 1 is not receiving an operation of the operator and the longitudinal direction of the shaft member 20 is the up-down direction. In FIG. 11, an arrow passing through the first magnet 24 or the second magnet 25 conceptually shows a magnetic field generated by the first magnet 24 or the second magnet 25.

Figure 12:
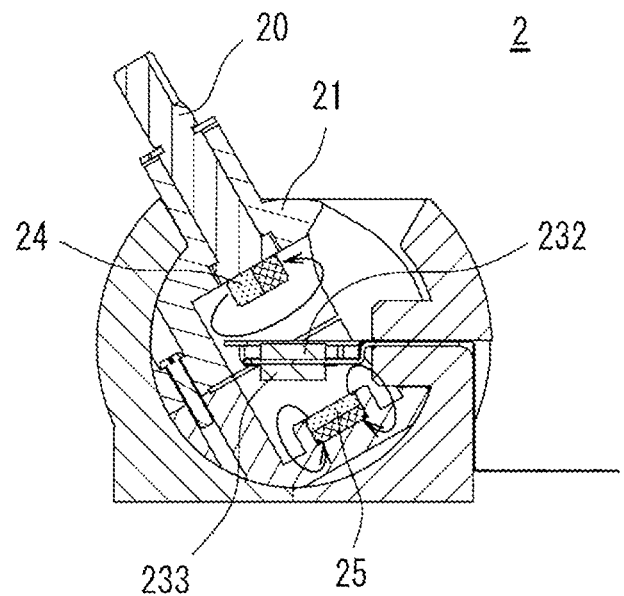
FIG. 12 is a schematic cross-sectional view showing an example of the detection device according to the present application.

FIG. 12 is a schematic cross-sectional view showing an example of the detection device 2 according to the present application. FIG. 12 shows a state in which the shaft member 20 and the spherical body 21 of the detection device 2 tilt from the reference position shown in FIG. 11 in response to a tilting operation of the operator. In the case where the operation part 12 receives a tilting operation, the shaft member 20 and the spherical body 21 of the detection device 2 tilt with the center of the spherical body 21 as a fulcrum. In the case where the shaft member 20 and the spherical body 21 tilt, the magnetic field due to the first magnet 24 detected by the first magnetic field sensor 232 and the magnetic field due to the second magnet 25 detected by the second magnetic field sensor 233 change. The present application illustrates an embodiment in which the change in the magnetic field due to tilting is detected by the second magnetic field sensor 233.

Figure 13:
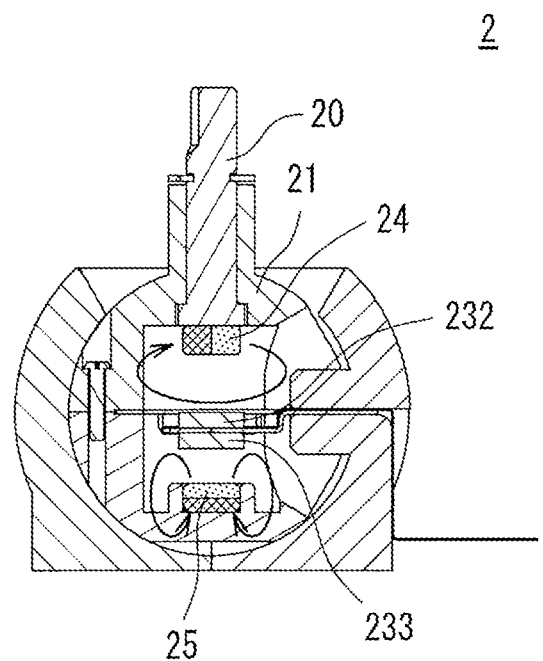
FIG. 13 is a schematic cross-sectional view showing an example of the detection device according to the present application.

FIG. 13 is a schematic cross-sectional view showing an example of the detection device 2 according to the present application. FIG. 13 shows a state in which the shaft member 20 of the detection device 2 rotates by 180° in the circumferential direction around the central axis from the reference position shown in FIG. 11 in response to a rotation operation of the operator. In the case where the operation part 12 receives a rotation operation, the shaft member 20 of the detection device 2 rotates in the circumferential direction around the central axis. The spherical body 21 does not act in conjunction with the rotation action of the shaft member 20. In the case where the shaft member 20 rotates, the magnetic field due to the first magnet 24 detected by the first magnetic field sensor 232 changes. As illustrated in FIG. 13, in the case of rotating by 180°, the first magnetic field sensor 232 detects that the orientation of the magnetic field has become the opposite direction. The present application illustrates an embodiment in which the change in the magnetic field due to rotation is detected by the first magnetic field sensor 232.

As described above, the operation device 1 and the detection device 2 according to the first embodiment of the present application receives an operation on the operation part 12 as an action with respect to the shaft member 20. The tilting action and the rotation action with respect to the shaft member 20 are detected as changes in the magnetic fields generated by the first magnet 24 and the second magnet 25, are transmitted via the first connection line 230, and are outputted as electrical signals.

Second Embodiment

The second embodiment is an embodiment in which a function of automatically returning the shaft member 20, which has tilted from the reference position, back to the reference position is added in the first embodiment. In the second embodiment, the same configurations as in the first embodiment will be labeled with the same reference signs, and detailed descriptions thereof will be omitted.

Figure 14:
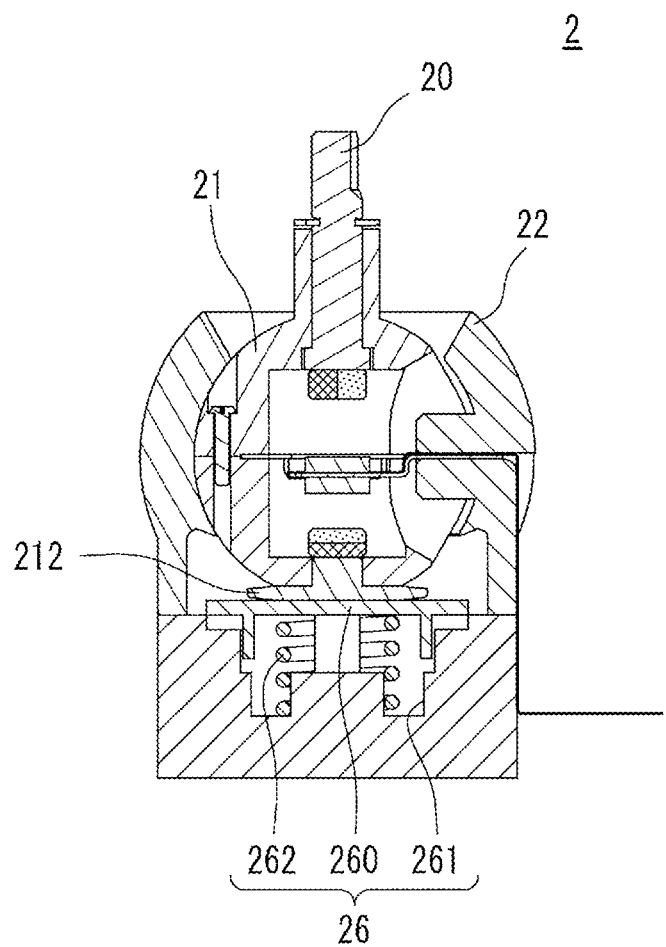
FIG. 14 is a schematic cross-sectional view showing an example of the detection device according to the present application.
Figure 15:
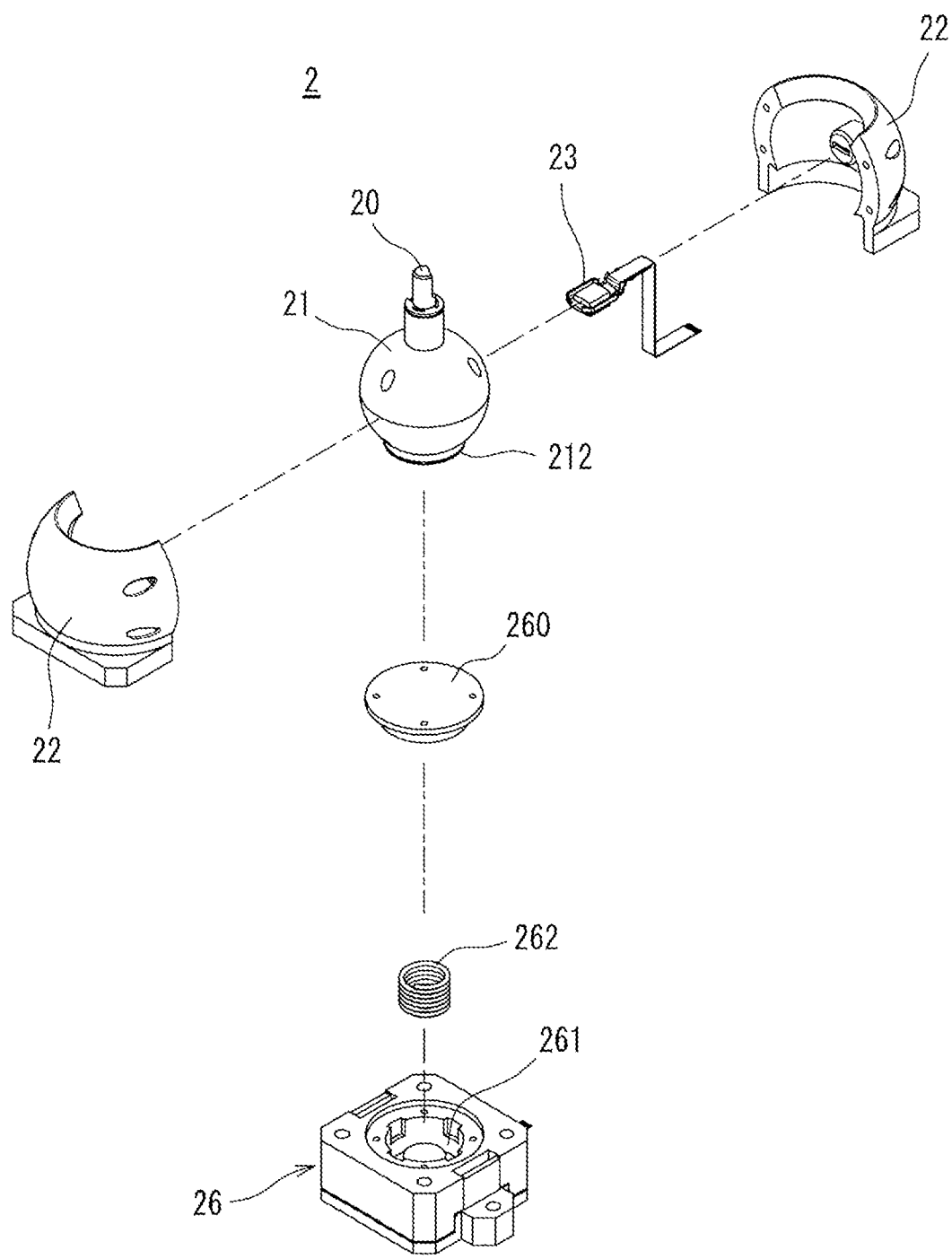
FIG. 15 is a schematic exploded perspective view showing an example of the detection device according to the present application.

FIG. 14 is a schematic cross-sectional view showing an example of the detection device 2 according to the present application. FIG. 15 is a schematic exploded perspective view showing an example of the detection device 2 according to the present application. The configurations of various members such as the shaft member 20, the spherical body 21, the inside of the spherical body 21, and the holding member 22 included in the detection device 2 according to the second embodiment are substantially similar to those in the first embodiment. The detection device 2 according to the second embodiment includes a pressed member 212 at the lower end of the spherical body 21 and a lower mechanism 26 at the lower part of the holding member 22.

The pressed member 212 attached to the lower end of the spherical body 21 has a substantially disk shape and is formed such that the vicinity of the center is flat and the peripheral part warps toward the spherical body 21 side.

The lower mechanism 26 attached to the lower part of the holding member 22 includes a pressing member 260 that presses the pressed member 212 at the lower end of the spherical body 21 from below to above. The pressing member 260 has an upper part in a disk shape and a lower part extending downward into a cylindrical shape. A loose fitting groove 261 into which the pressing member 260 loosely fits with slight play is formed at the lower mechanism 26. The pressing member 260 loosely fits into the loose fitting groove 261 and moves up and down. Further, a first biasing member 262 using a return spring such as a compression coil spring is arranged in the loose fitting groove 261. The first biasing member 262 has a lower end fixed to the inner bottom surface of the loose fitting groove 261, and an upper end abutting against the pressing member 260 to bias the pressing member 260 upward. With the first biasing member 262 biasing the pressing member 260 upward, the upper surface of the pressing member 260 abuts against the pressed member 212 attached to the lower end of the spherical body 21 and presses the pressed member 212 upward.

Figure 16:
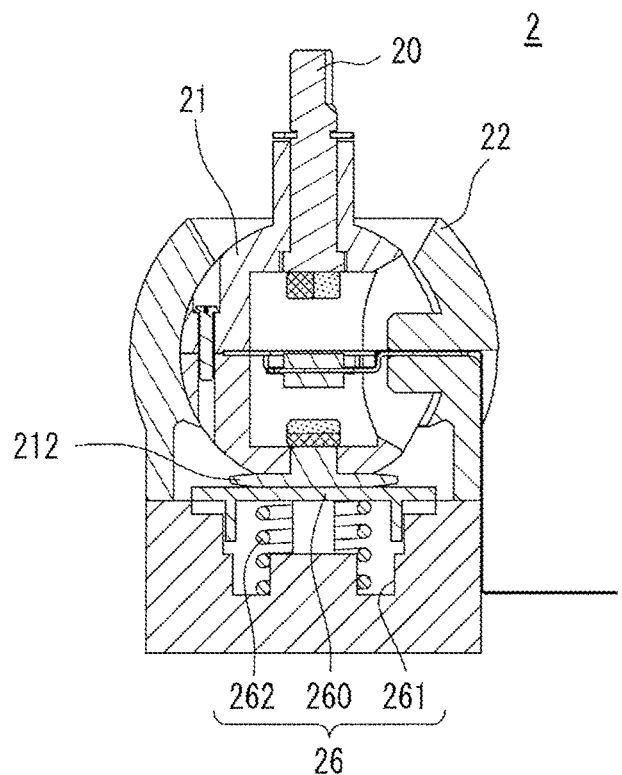
FIG. 16 is a schematic cross-sectional view showing an example of the detection device according to the present application.
Figure 17:
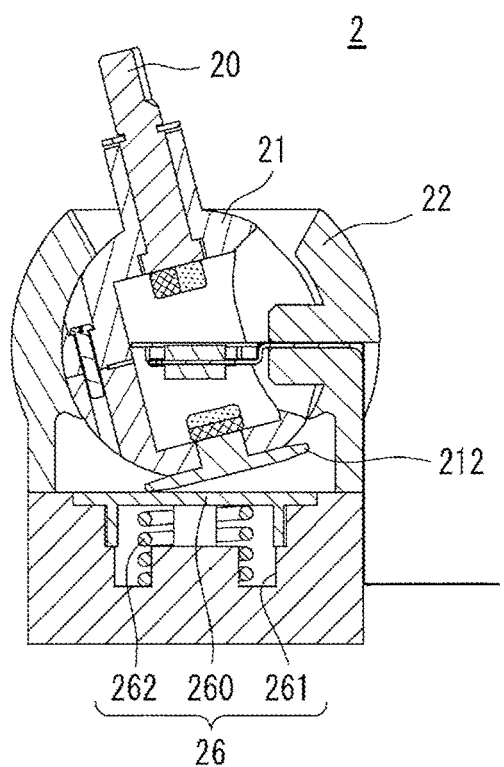
FIG. 17 is a schematic cross-sectional view showing an example of the detection device according to the present application.

Next, an action of the detection device 2 according to the present application will be described. FIG. 16 and FIG. 17 are schematic cross-sectional views showing an example of the detection device 2 according to the present application. FIG. 16 shows a state in which the shaft member 20 of the detection device 2 is at the reference position, and FIG. 17 shows a state in which the shaft member 20 and the spherical body 21 tilt from the reference position in response to a tilting operation of the operator. As illustrated in FIG. 16, in the case where the shaft member 20 is at the reference position, the pressing member 260 presses the flat vicinity of the center of the pressed member 212 toward the upper side where the center of the spherical body 21 is positioned, so the shaft member 20 and the spherical body 21 have stabilized postures. As illustrated in FIG. 17, upon tilting of the shaft member 20 and the spherical body 21, the peripheral part of the pressed member 212 presses the pressing member 260 downward. In the state illustrated in FIG. 17, since the pressing member 260 presses the peripheral part of the pressed member 212 toward the upper side where the center of the spherical body 21 is positioned, a force acts in a rotation direction in which the spherical body 21 returns to the reference position. As illustrated in FIG. 16, in the case where the shaft member 20 and the spherical body 21 are at the reference position, the shaft member 20 and the spherical body 21 are stabilized. As illustrated in FIG. 17, in the case where the shaft member 20 and the spherical body 21 tilt from the reference position, a force acts in a direction returning to the reference position and the shaft member 20 and the spherical body 21 become unstable. Thus, upon release of the tilting force applied by the operator, the shaft member 20 and the spherical body 21 return to the reference position.

As described above, in the detection device 2 according to the second embodiment of the present application, the pressed member 212 is attached to the lower end of the spherical body 21 and the pressed member 212 is pressed upward by the lower mechanism 26 below. Accordingly, excellent effects are achieved such as being capable of realizing a detection device 2 in which a force acts in a direction returning to the spherical body 21 in the case where the spherical body 21 and the shaft member 20 acting in conjunction with the tilting action of the spherical body 21 tilt from the reference position.

Third Embodiment

The third embodiment is an embodiment in which a function corresponding to an operation of pressing the operation part 12 downward is added in the first embodiment, and an action in which the shaft member 20 moves in the extending direction of the central axis is performed. In the third embodiment, the same configurations as in the first embodiment or the second embodiment will be labeled with the same reference signs as in the first embodiment and the second embodiment, and detailed descriptions thereof will be omitted.

Figure 18:
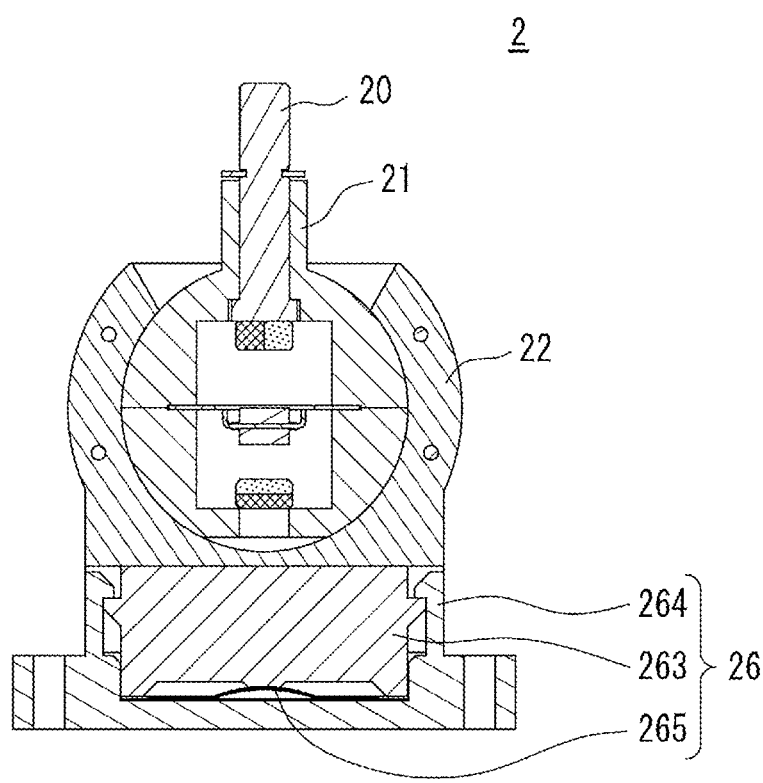
FIG. 18 is a schematic cross-sectional view showing an example of the detection device according to the present application.
Figure 19:
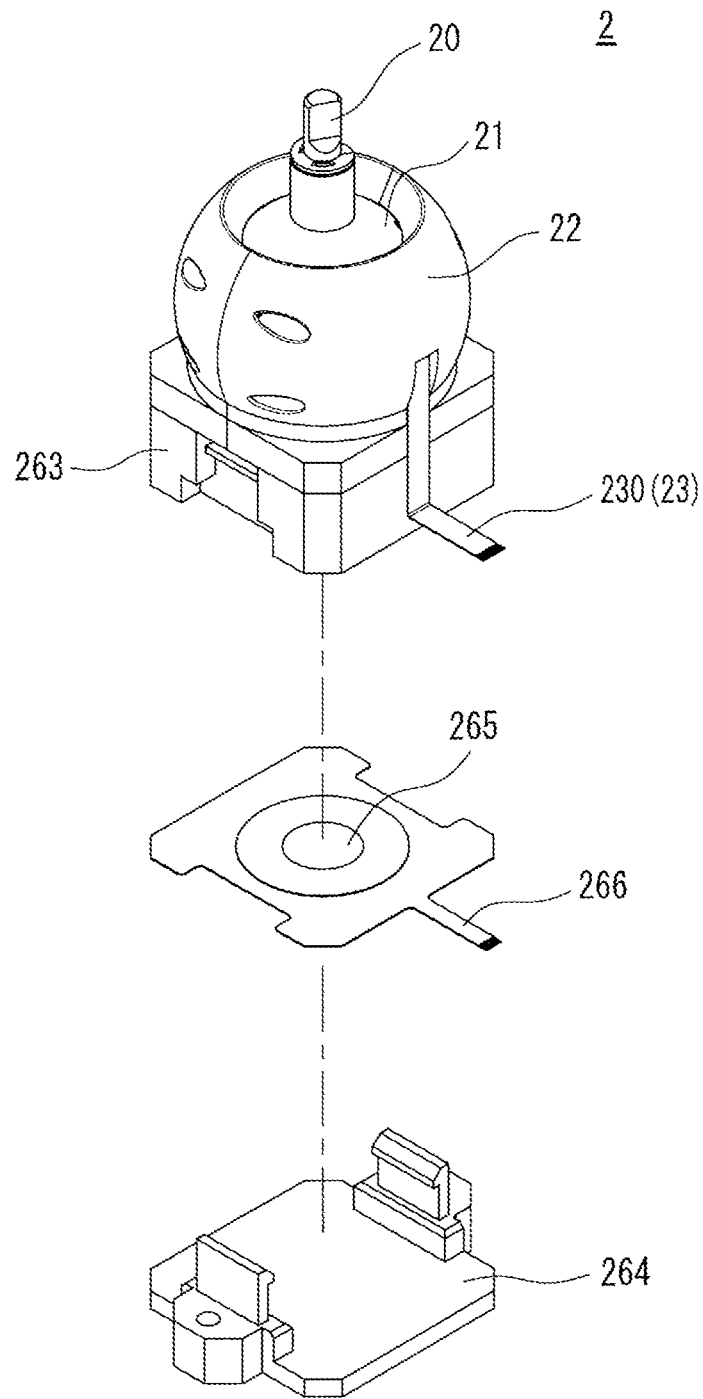
FIG. 19 is a schematic exploded perspective view showing an example of the detection device according to the present application.

FIG. 18 is a schematic cross-sectional view showing an example of the detection device 2 according to the present application. FIG. 19 is a schematic exploded perspective view showing an example of the detection device 2 according to the present application. FIG. 19 shows the lower mechanism 26 included in the detection device 2 in an exploded state. In the detection device 2 according to the third embodiment, in response to an operation of pressing the operation part 12, the shaft member 20 acts downward in the extending direction of the central axis, and the spherical body 21 to which the shaft member 20 is attached and the holding member 22 holding the spherical body 21 act downward in conjunction with the shaft member 20. In other words, the detection device 2 according to the third embodiment has a function corresponding to a so-called click operation. The configurations of various members such as the shaft member 20, the spherical body 21, the inside of the spherical body 21, and the holding member 22 included in the detection device 2 according to the third embodiment are substantially similar to those in the embodiments such as the first embodiment.

The lower mechanism 26 included in the detection device 2 includes a movable member 263 fixed to the lower end of the holding member 22, a fixed member 264 that holds the movable member 263 with the movable member 263 being capable of acting upward and downward, and a tactile switch 265 that is fixed to the fixed member 264 between the movable member 263 and the fixed member 264 and receives a pressing based on downward movement of the movable member 263. A second connection line 266 that transmits an electrical signal based on the pressing detected by the tactile switch 265 is connected to the tactile switch 265.

In the detection device 2 according to the third embodiment, in conjunction with the downward movement of the shaft member 20 based on the pressing operation on the operation part 12, the movable member 263 is guided by the fixed member 264 to move downward and press the tactile switch 265. The tactile switch 265 detects the pressing by the movable member 263 and outputs, via the second connection line 266, the detected pressing as an electrical signal indicating an action of the shaft member 20 moving downward. Further, the tactile switch 265 generates an operation feeling, namely, a click feeling, based on the pressing operation.

As described above, in the detection device 2 according to the third embodiment of the present application, the lower mechanism 26 includes the movable member 263, the fixed member 264, and the tactile switch 265. Accordingly, it is possible to realize a detection device 2 that detects an action in which the shaft member 20 moves downward based on a pressing operation.

Fourth Embodiment

The fourth embodiment is an embodiment in which a function corresponding to an operation of pressing the operation part 12 downward is added in the second embodiment, and an action in which the shaft member 20 moves in the extending direction of the central axis is performed. In the fourth embodiment, the same configurations as in any of the first embodiment to the third embodiment will be labeled with the same reference signs as in the first embodiment to the third embodiment, and detailed descriptions thereof will be omitted.

Figure 20:
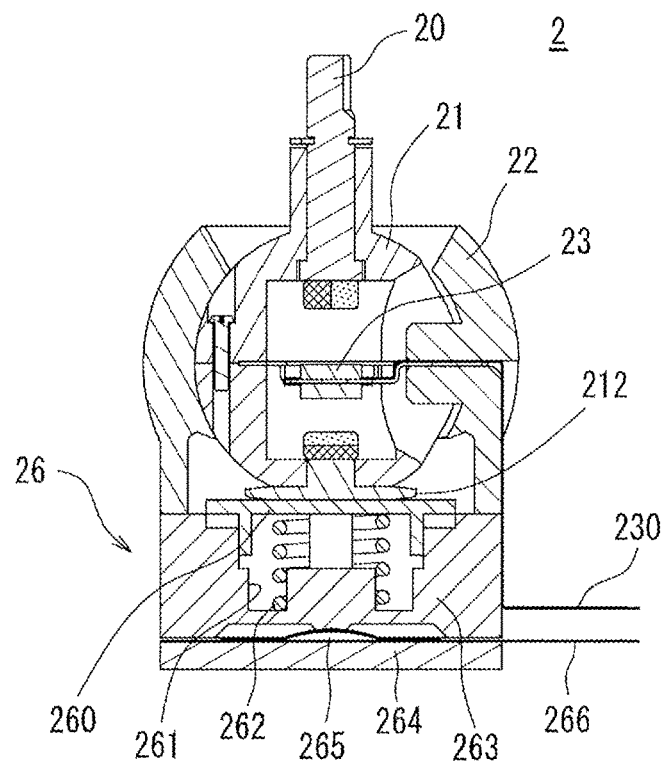
FIG. 20 is a schematic cross-sectional view showing an example of the detection device according to the present application.

FIG. 20 is a schematic cross-sectional view showing an example of the detection device 2 according to the present application. The configurations of various members such as the shaft member 20, the spherical body 21, the inside of the spherical body 21, and the holding member 22 included in the detection device 2 according to the fourth embodiment are substantially similar to those in the embodiments such as the first embodiment. The detection device 2 according to the fourth embodiment includes a pressed member 212 at the lower end of the spherical body 21 and a lower mechanism 26 at the lower end of the holding member 22. The lower mechanism 26 includes a movable member 263, a fixed member 264, a tactile switch 265, and a second connection line 266, and the movable member 263 includes a pressing member 260 and a first biasing member 262.

Since the fourth embodiment is an embodiment combining the second embodiment and the third embodiment, reference is made to the second embodiment and the third embodiment for the actions and functions of various members based on the operation of the operator, and descriptions thereof will be omitted.

Fifth Embodiment

The fifth embodiment is an embodiment in which a function corresponding to an operation of pressing the operation part 12 downward is added in the first embodiment, and is an embodiment in which the action of the shaft member 20 is detected with a structure different from that in the third embodiment.

Figure 21:
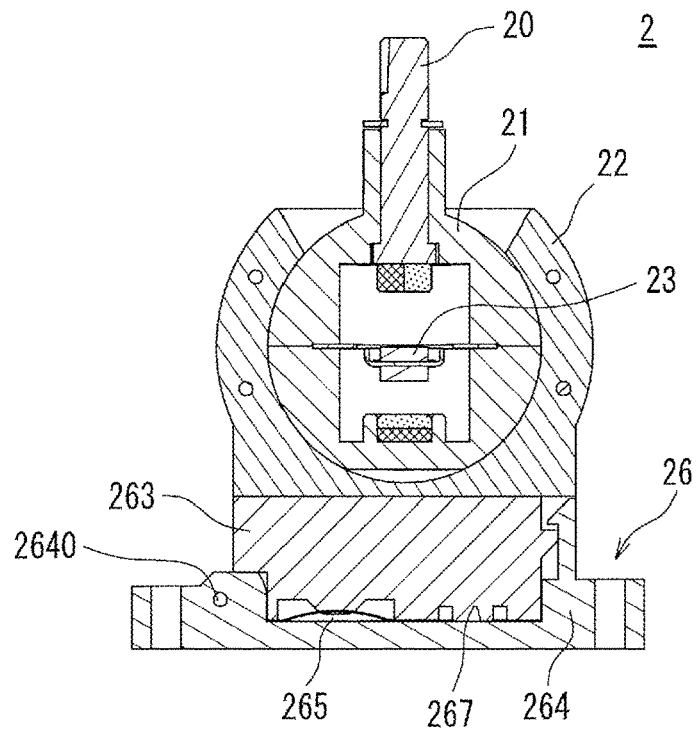
FIG. 21 is a schematic cross-sectional view showing an example of the detection device according to the present application.
Figure 22:
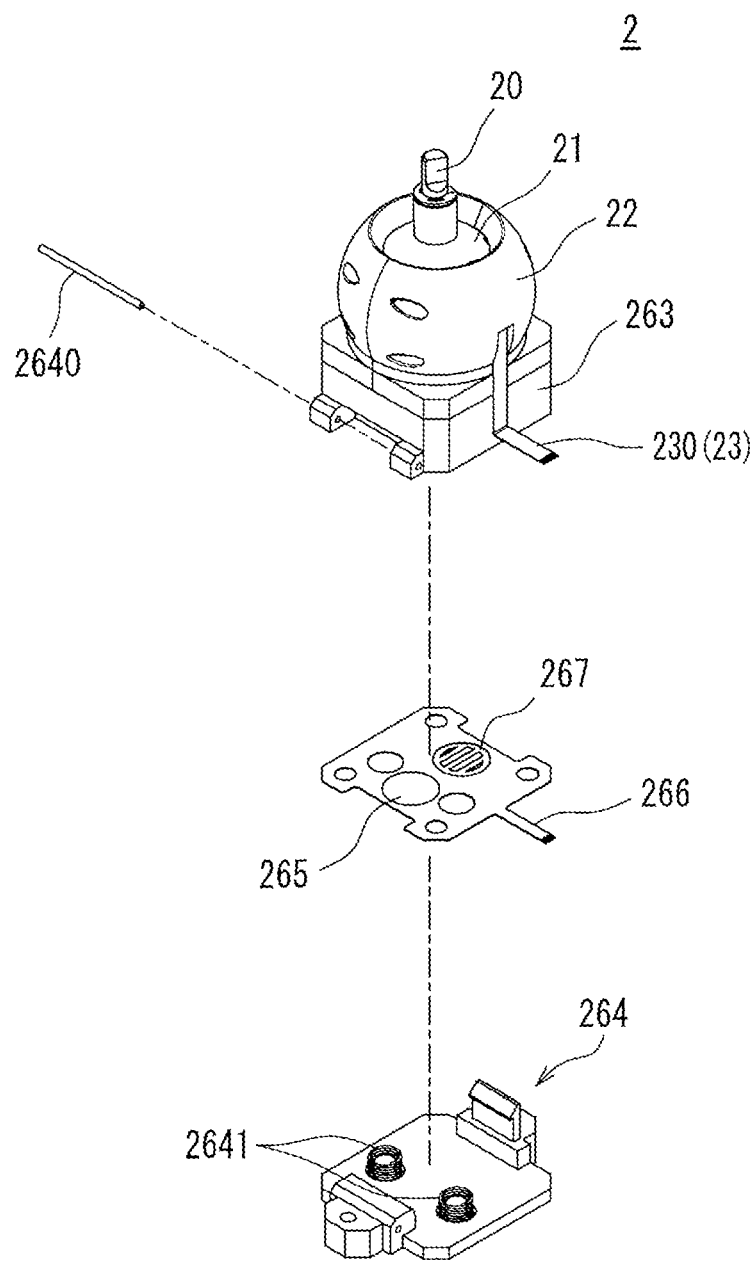
FIG. 22 is a schematic exploded perspective view showing an example of the detection device according to the present application.

FIG. 21 is a schematic cross-sectional view showing an example of the detection device 2 according to the present application. FIG. 22 is a schematic exploded perspective view showing an example of the detection device 2 according to the present application. FIG. 21 shows the lower mechanism 26 included in the detection device 2 in an exploded state. In the detection device 2 according to the fifth embodiment, in response to an operation of pressing the operation part 12, the shaft member 20 acts downward in the extending direction of the central axis, and the spherical body 21 to which the shaft member 20 is attached and the holding member 22 holding the spherical body 21 act downward in conjunction with the shaft member 20. That is, the detection device 2 according to the fifth embodiment has a function corresponding to a so-called click operation. The configurations of various members such as the shaft member 20, the spherical body 21, the inside of the spherical body 21, and the holding member 22 included in the detection device 2 according to the fifth embodiment are substantially similar to those in the embodiments such as the first embodiment.

The lower mechanism 26 included in the detection device 2 includes a movable member 263 fixed to the lower end of the holding member 22, a fixed member 264 that swingably holds the movable member 263, and a tactile switch 265 and a pressure sensor 267 that are arranged between the movable member 263 and the fixed member 264 and receive a pressing based on downward movement of the movable member 263. A second connection line 266 transmitting an electrical signal based on the pressing detected by the pressure sensor 267 is connected to the pressure sensor 267. Furthermore, the fixed member 264 has a pivot pin 2640 that pivotally supports the movable member 263 swingably, and two second biasing members 2641 using return springs such as compression coil springs that bias the movable member 263 upward.

In the detection device 2 according to the fifth embodiment, in conjunction with the downward movement of the shaft member 20 based on the pressing operation on the operation part 12, the movable member 263 swings downward with the pivot pin 2640 as a swinging axis and presses the tactile switch 265 and the pressure sensor 267. In the detection device 2 according to the fifth embodiment, since the angle at which the movable member 263 swings due to the pressing operation is minute, the action of the shaft member 20 may be regarded as substantially identical to a minute up-down movement. The pressure sensor 267 detects the pressing by the movable member 263 and outputs, via the second connection line 266, the pressing as an electrical signal indicating an action in which the shaft member 20 moves downward. In response to the pressing from the movable member 263, the tactile switch 265 generates an operation feeling, namely, a click feeling, based on the pressing operation. Upon release of the pressing on the operation part 12, biased by the second biasing members 2641, members such as the shaft member 20, the spherical body 21, and the movable member 263 return to the reference position. In the case where the click feeling is not required or in the case where a mechanism that generates an operation feeling other than the tactile switch 265 is provided, it is also possible to configure the detection device 2 according to the fifth embodiment without the tactile switch 265.

As described above, in the detection device 2 according to the fifth embodiment of the present application, the lower mechanism 26 includes the pressure sensor 267. Accordingly, it is possible to realize a detection device 2 that detects an action in which the shaft member 20 moves downward based on a pressing operation.

Sixth Embodiment

The sixth embodiment is an embodiment in which a function corresponding to an operation of pressing the operation part 12 downward is added in the second embodiment, and is an embodiment in which the action of the shaft member 20 is detected with a structure different from that in the fourth embodiment. In the sixth embodiment, the same configurations as in any of the first embodiment to the fifth embodiment will be labeled with the same reference signs as in the first embodiment to the fifth embodiment, and detailed descriptions thereof will be omitted.

Figure 23:
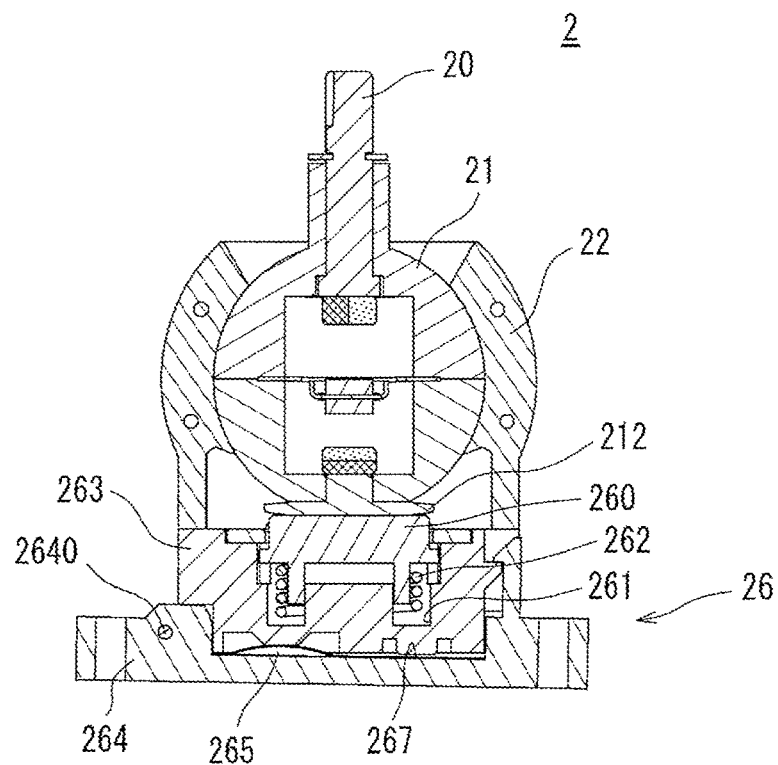
FIG. 23 is a schematic cross-sectional view showing an example of the detection device according to the present application.

FIG. 23 is a schematic cross-sectional view showing an example of the detection device 2 according to the present application. The configurations of various members such as the shaft member 20, the spherical body 21, the inside of the spherical body 21, and the holding member 22 included in the detection device 2 according to the sixth embodiment are substantially similar to those in the embodiments such as the first embodiment. The detection device 2 according to the sixth embodiment includes a pressed member 212 at the lower end of the spherical body 21 and a lower mechanism 26 at the lower end of the holding member 22. The lower mechanism 26 includes a movable member 263, a fixed member 264, a tactile switch 265, a pressure sensor 267, and a second connection line 266. The fixed member 264 includes a pivot pin 2640 and two second biasing members 2641.

Since the sixth embodiment is an embodiment combining the second embodiment and the fifth embodiment, reference is made to the second embodiment and the fifth embodiment for the actions and functions of various members based on the operation of the operator, and descriptions thereof will be omitted.

Seventh Embodiment

The seventh embodiment is an embodiment in which, in addition to the function of pressing downward, a function of pulling the operation part 12 upward is added in the fourth embodiment. In the seventh embodiment, the same configurations as in any of the first embodiment to the sixth embodiment will be labeled with the same reference signs as in the first embodiment to the sixth embodiment, and detailed descriptions thereof will be omitted.

Figure 24:
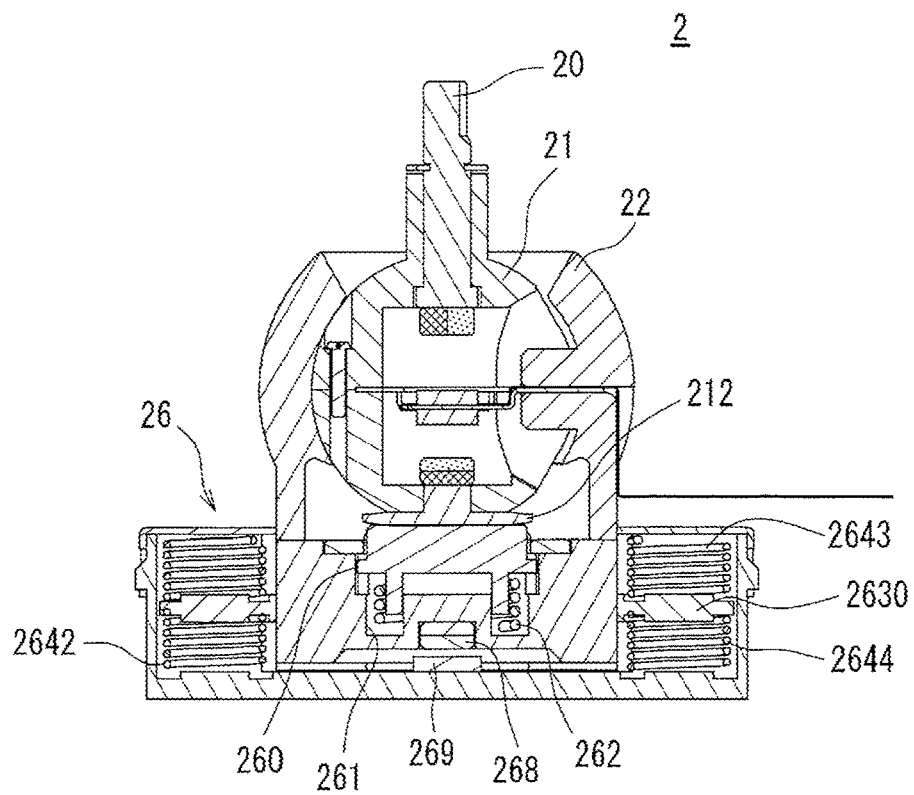
FIG. 24 is a schematic cross-sectional view showing an example of the detection device according to the present application.
Figure 25:
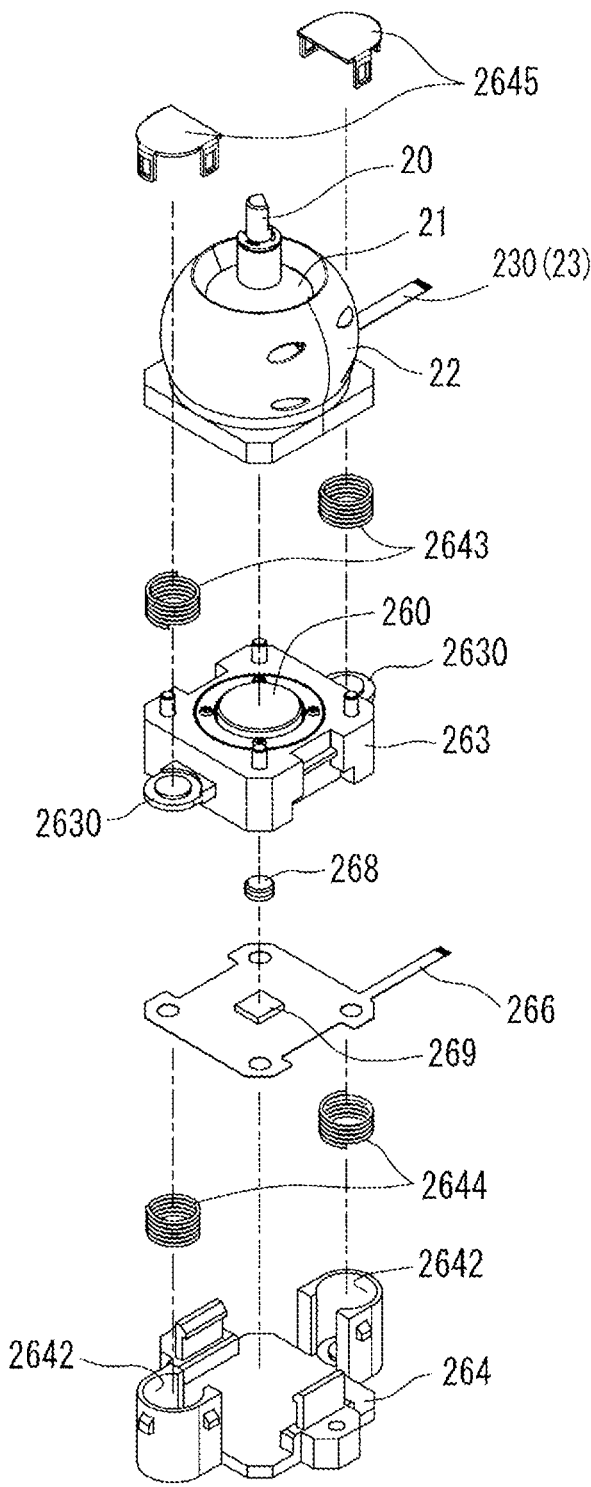
FIG. 25 is a schematic exploded perspective view showing an example of the detection device according to the present application.

FIG. 24 is a schematic cross-sectional view showing an example of the detection device 2 according to the present application. FIG. 25 is a schematic exploded perspective view showing an example of the detection device 2 according to the present application. The configurations of various members such as the shaft member 20, the spherical body 21, the inside of the spherical body 21, and the holding member 22 included in the detection device 2 according to the seventh embodiment are substantially similar to those in the embodiments such as the first embodiment. The detection device 2 according to the seventh embodiment includes a lower mechanism 26 at the lower end of the holding member 22.

The lower mechanism 26 includes a movable member 263 fixed to the lower end of the holding member 22, a fixed member 264 that holds the movable member 263 movably in the up-down direction, and a third magnet 268 and a third magnetic field sensor 269 positioned between the movable member 263 and the fixed member 264. The third magnet 268 is fixed to the lower surface of the movable member 263. The third magnetic field sensor 269 is fixed to the fixed member 264 to face the third magnet 268. A second connection line 266 transmitting an electrical signal based on the magnetic field detected by the third magnetic field sensor 269 is connected to the third magnetic field sensor 269. The third magnetic field sensor 269 detects the magnetic field generated by the third magnet 268 in a space between the movable member 263 and the fixed member 264.

The movable member 263 has a substantially rectangular parallelepiped shape, and a disk-shaped overhang part 2630 overhanging outward is formed on two opposing sides among four sides of the movable member 263. The overhang part 2630 moves up and down together with the up-down movement of the movable member 263. A cylindrical guide part 2642 that accommodates the overhang part 2630 of the movable member 263 movably in the up-down direction is formed at the fixed member 264. Inside the guide part 2642 of the fixed member 264, a third biasing member 2643 using a return spring such as a compression coil spring is arranged above the accommodated overhang part 2630, and a fourth biasing member 2644 using a return spring such as a compression coil spring is arranged below the overhang part 2630. An upper end portion of the guide part 2642 forms a removable lid part 2645. During assembly of the lower mechanism 26, after loosely fitting the overhang part 2630 of the movable member 263 into the guide part 2642 of the fixed member 264 from the opening on the upper end side, the opening of the guide part 2642 is closed by the lid part 2645.

In the detection device 2 according to the present application configured as described above, in the case where the operation part 12 is pressed down, the movable member 263 moves downward in conjunction with the shaft member 20 and the spherical body 21. Upon release of the pressing down, the fourth biasing member 2644 arranged below the overhang part 2630 of the movable member 263 biases the overhang part 2630 upward, and the movable member 263 returns to its original position. In the case where the operation part 12 is pulled up, the movable member 263 moves upward in conjunction with the shaft member 20 and the spherical body 21. Upon release of the pulling up, the third biasing member 2643 arranged above the overhang part 2630 of the movable member 263 biases the overhang part 2630 downward, and the movable member 263 returns to its original position. Since the guide part 2642 guides the up-down movement of the overhang part 2630, the action of the movable member 263 is stable. Upon up-down movement of the movable member 263, the distance between the third magnet 268 and the third magnetic field sensor 269 changes. The third magnetic field sensor 269 detects the magnetic field generated by the third magnet 268 and outputs an electrical signal indicating the detected magnetic field via a third connection line. The movement of the movable member 263 in the up-down direction is detected according to the magnetic field detected by the third magnetic field sensor 269.

As described above, the detection device 2 according to the seventh embodiment of the present application includes the third magnet 268 and the third magnetic field sensor 269 in the lower mechanism 26. Accordingly, it is possible to realize a detection device 2 that detects not only a downward movement but also an action of moving upward of the shaft member 20.

Eighth Embodiment

The eighth embodiment is an embodiment in which a function of detecting an up-down operation of the operation part 12 is realized with a structure different from that in the seventh embodiment. In the eighth embodiment, the same configurations as in any of the first embodiment to the seventh embodiment will be labeled with the same reference signs as in the first embodiment to the seventh embodiment, and detailed descriptions thereof will be omitted.

Figure 26:
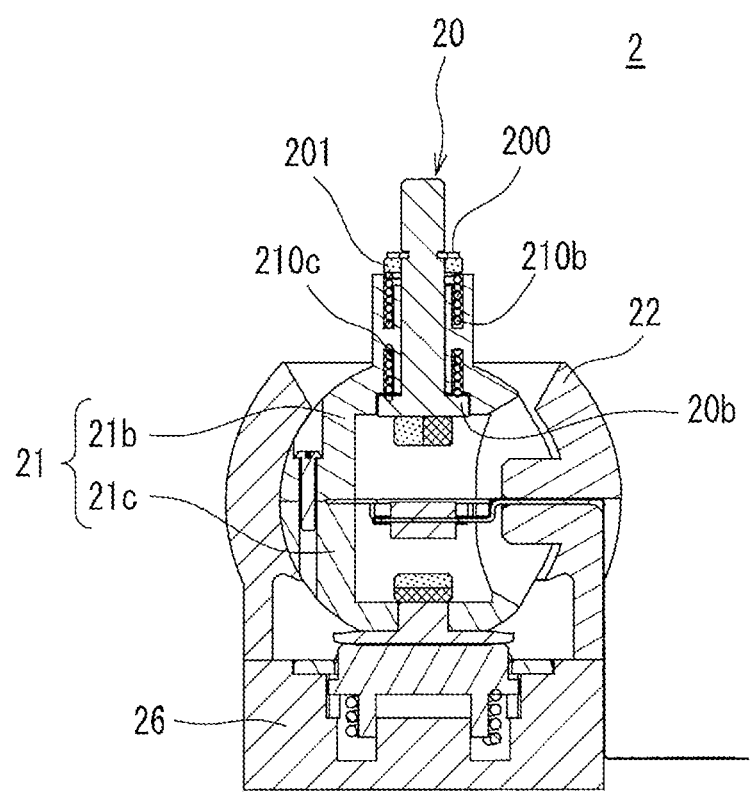
FIG. 26 is a schematic cross-sectional view showing an example of the detection device according to the present application.
Figure 27:
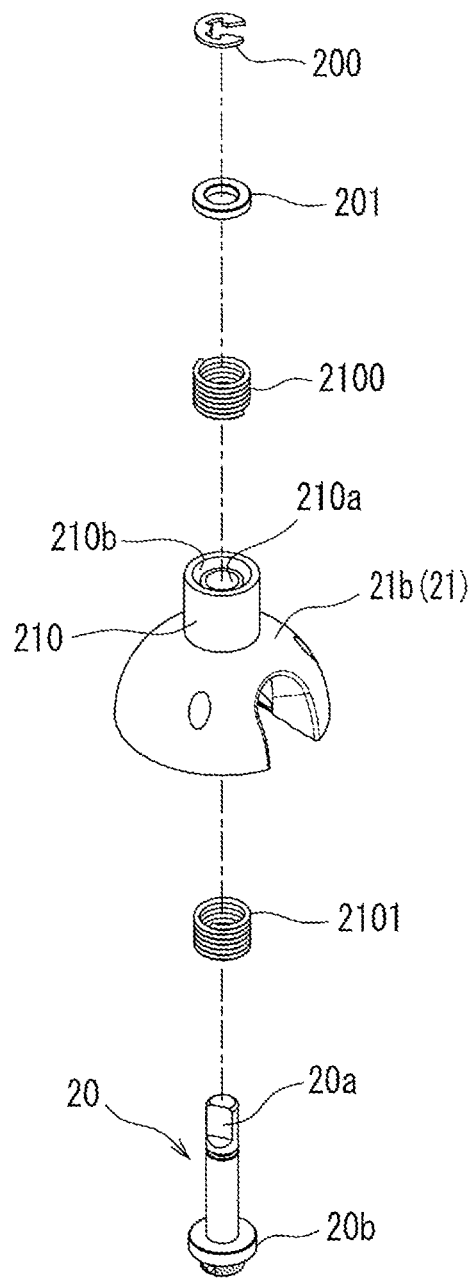
FIG. 27 is a schematic exploded perspective view showing an example of a part of the detection device according to the present application.

FIG. 26 is a schematic cross-sectional view showing an example of the detection device 2 according to the present application. FIG. 27 is a schematic exploded perspective view showing an example of a part of the detection device 2 according to the present application. FIG. 27 is an exploded perspective view of the upper half body 21b of the spherical body 21, the shaft member 20, and surrounding members included in the detection device 2. Members other than the upper half body 21b of the spherical body 21, the shaft member 20, and the surrounding members illustrated in FIG. 27 are similar to those in the fourth embodiment, so reference is made to the fourth embodiment and descriptions thereof will be omitted.

The substantially cylindrical insertion part 210 formed at the upper end of the spherical body 21 has an upper annular groove 210b and a lower annular groove 210c engraved around the insertion hole 210a passing through the center. The upper annular groove 210b and the lower annular groove 210c are annular grooves that share the same center as the insertion hole 210a and have a larger radius than the insertion hole 210a. The upper annular groove 210b is engraved at a depth from the upper end of the insertion part 210 to the vicinity of the center, and the lower annular groove 210c is engraved at a depth from the lower end of the insertion part 210 to the vicinity of the center. The lower end of the upper annular groove 210b has a depth reaching the vicinity of the upper end of the lower annular groove 210c, but the upper annular groove 210b and the lower annular groove 210c are not connected and are partitioned.

A fifth biasing member 2100 using a return spring such as a compression coil spring is inserted into the upper annular groove 210b. The opening at the upper end of the upper annular groove 210b is arranged with an annular plate 201 and abuts against the fastener 200 of the shaft member 20 from below via the annular plate 201. The fifth biasing member 2100 has a lower end that is attached to the bottom of the upper annular groove 210b, and an upper end that biases the shaft member 20 upward via the annular plate 201 and the fastener 200.

A sixth biasing member 2101 using a return spring such as a compression coil spring is inserted into the lower annular groove 210c. The sixth biasing member 2101 has an upper end that is attached to the bottom of the lower annular groove 210c, and a lower end that biases the shaft member 20 downward via the flange part 20b.

In the detection device 2 according to the eighth embodiment, a length from the lower surface of the annular plate 201 of the shaft member 20 to the upper surface of the flange part 20b is formed slightly greater than a length from the upper end to the lower end of the insertion part 210 of the spherical body 21. In the detection device 2 formed in this manner, the shaft member 20 moves up and down independently of the spherical body 21.

In the detection device 2 according to the present application configured as described above, in the case where the operation part 12 is pressed down, the shaft member 20 moves downward. Upon release of the pressing down, the fifth biasing member 2100 biases the shaft member 20 upward via the annular plate 201 and the fastener 200, and the shaft member 20 returns to the reference position. In the case where the operation part 12 is pulled up, the shaft member 20 moves upward. Upon release of the pulling up, the sixth biasing member 2101 biases the shaft member 20 downward via the flange part 20b, and the shaft member 20 returns to the reference position. In the case where the shaft member 20 moves up and down, the distance between the first magnet 24 fixed to the lower end of the shaft member 20 and the first magnetic field sensor 232 changes. The first magnetic field sensor 232 detects a magnetic field generated by the first magnet 24 and outputs an electrical signal indicating the detected magnetic field via the first connection line 230. The movement of the shaft member 20 in the up-down direction is detected according to the magnetic field detected by the first magnetic field sensor 232. That is, in the detection device 2 according to the eighth embodiment, not only rotation but also up-down movement of the shaft member 20 is detected according to the magnetic field detected by the first magnetic field sensor 232.

As described above, the detection device 2 according to the eighth embodiment of the present application is configured such that the fifth biasing member 2100 and the sixth biasing member 2101 are accommodated in the insertion part 210 of the spherical body 21, and further, the shaft member 20 moves up and down independently of the spherical body 21. Accordingly, it is possible to realize a detection device 2 that detects an action of the shaft member 20 in the up-down direction.

Ninth Embodiment

The ninth embodiment is an embodiment in which a function of holding the spherical body 21 tiltably in various directions with a structure different from that in other embodiments is included in the fourth embodiment. In the ninth embodiment, the same configurations as in any of the first embodiment to the eighth embodiment will be labeled with the same reference signs as in the first embodiment to the eighth embodiment, and detailed descriptions thereof will be omitted.

Figure 28:
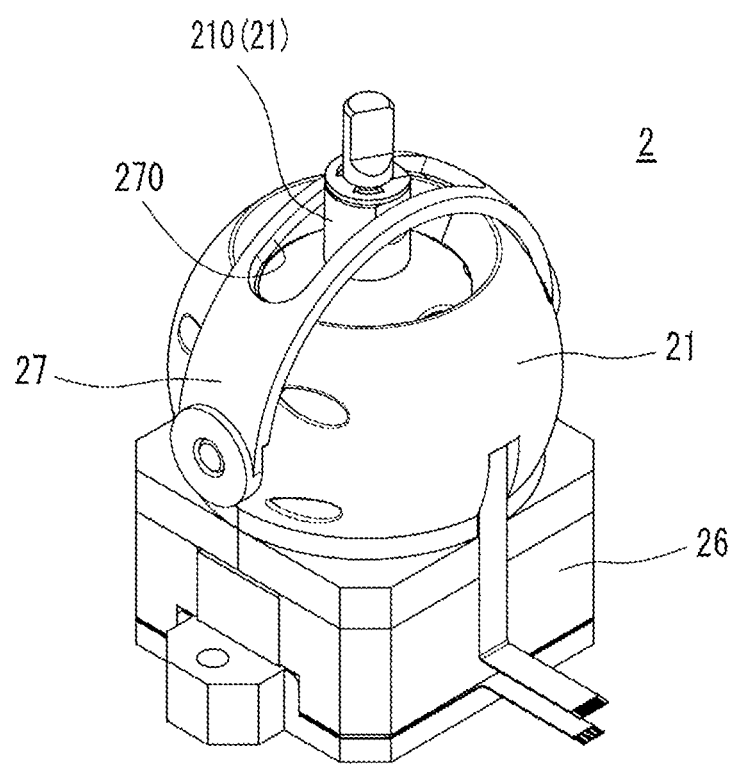
FIG. 28 is a schematic perspective view showing an example of the detection device according to the present application.

FIG. 28 is a schematic perspective view showing an example of the detection device 2 according to the present application. The detection device 2 according to the ninth embodiment includes an arc-shaped frame 27, which is an elongated plate bent in an arc shape, attached to the holding member 22. The arc-shaped frame 27 is curved in an arc shape along the outer surface of the holding member 22 having a substantially spherical shape. Two ends of the arc-shaped frame 27 having an elongated plate shape are pivotally and swingably supported on the outer surface of the holding member 22. The swing axes of the two ends are positioned on a virtual line passing through the center of the spherical body 21 in the horizontal direction. A guide hole 270 in an elongated circular shape is provided in the vicinity of the center of the arc-shaped frame 27, and the insertion part 210 of the spherical body 21 penetrates through the guide hole 270.

In the case where the spherical body 21 tilts in the longitudinal direction of the arc-shaped frame 27, the insertion part 210 is guided by the guide hole 270 and tilts. In the case where the spherical body 21 tilts in a direction perpendicular to the longitudinal direction of the arc-shaped frame 27, the insertion part 210 tilts together with the arc-shaped frame 27, which swings around the swing axis as the swing center. In the case where the spherical body 21 tilts in a direction other than the longitudinal direction of the arc-shaped frame 27 and the direction perpendicular to the longitudinal direction, it becomes a composite action of a tilting action in the longitudinal direction and a tilting action in the perpendicular direction. In the case where the shaft member 20 rotates, since the insertion part 210 of the spherical body 21 and the guide hole 270 of the arc-shaped frame 27 are in contact with each other at a planar portion, the spherical body 21 does not rotate. Thus, in the ninth embodiment, the protection part 220 of the holding member 22 is not required.

As described above, the detection device 2 according to the ninth embodiment of the present application is supported by the arc-shaped frame 27 tiltably in various directions.

Tenth Embodiment

The tenth embodiment is an embodiment in which the shape of the magnetic field detection unit 23 is modified in the first embodiment to the ninth embodiment. In the tenth embodiment, the same configurations as in any of the first embodiment to the ninth embodiment will be labeled with the same reference signs as in the first embodiment to the ninth embodiment, and detailed descriptions thereof will be omitted.

Figure 29:
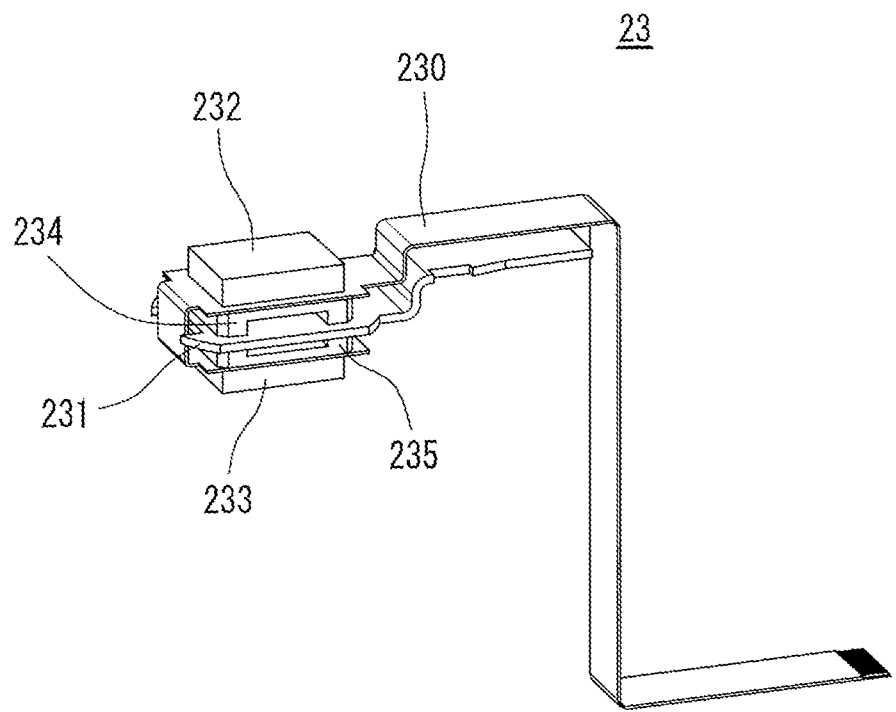
FIG. 29 is a schematic perspective view showing an example of the magnetic field detection unit included in the detection device 2 according to the present application.

FIG. 29 is a schematic perspective view showing an example of the magnetic field detection unit 23 included in the detection device 2 according to the present application. In the magnetic field detection unit 23 according to the tenth embodiment, a first spacer member 234 functioning as a spacer is arranged between the upper surface of the central magnetic shielding plate 231 and the first connection line 230, and a first magnetic field sensor 232 is arranged on the upper surface of the first connection line 230. Further, a second spacer member 235 is arranged between the lower surface of the central magnetic shielding plate 231 and the first connection line 230, and a second magnetic field sensor 233 is arranged on the lower surface of the first connection line 230. The first spacer member 234 and the second spacer member 235 are formed of a material such as an insulator that does not affect magnetic lines of force. The first spacer member 234 prevents the central magnetic shielding plate 231 from affecting the magnetic field detected by the first magnetic field sensor 232. The second spacer member 235 prevents the central magnetic shielding plate 231 from affecting the magnetic field detected by the second magnetic field sensor 233.

Figure 30:
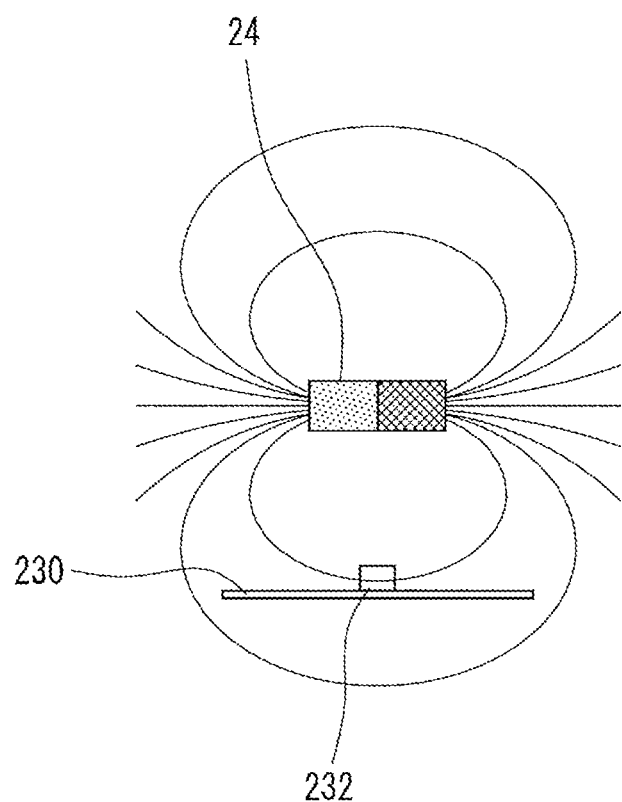
FIG. 30 is a view conceptually illustrating an example of a magnetic field formed by a first magnet.

FIG. 30 is a view conceptually illustrating an example of a magnetic field formed by the first magnet 24. FIG. 30 conceptually shows a virtual model in which the central magnetic shielding plate 231 is absent, and the first magnetic field sensor 232 is arranged on the upper surface of the first connection line 230. In the virtual model shown in FIG. 30, the magnetic field formed by the first magnet 24 is not subjected to significant influence from other members.

Figure 31:
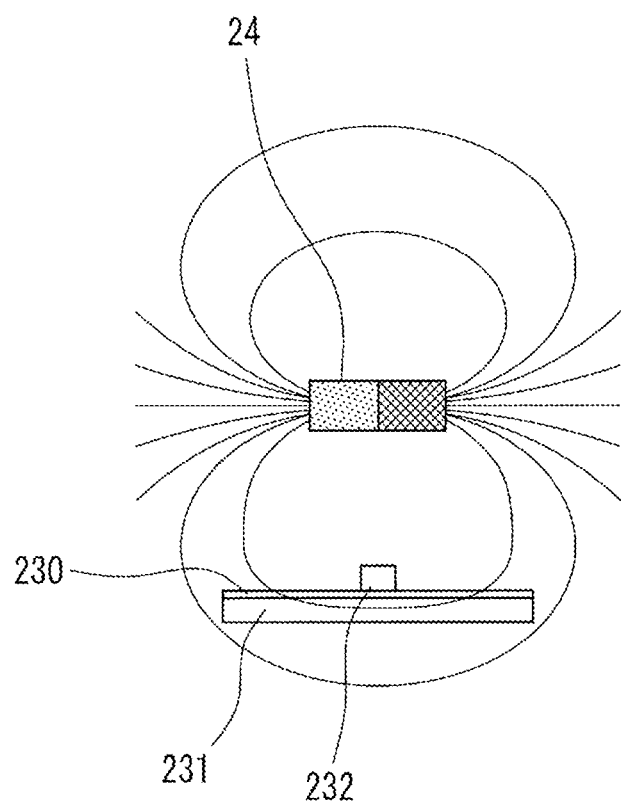
FIG. 31 is a view conceptually illustrating an example of the magnetic field formed by the first magnet.

FIG. 31 is a view conceptually illustrating an example of the magnetic field formed by the first magnet 24. FIG. 31 conceptually shows a virtual model in which the first connection line 230 is directly arranged on the upper surface of the central magnetic shielding plate 231, and the first magnetic field sensor 232 is arranged on the upper surface of the first connection line 230. Depending on the material of the central magnetic shielding plate 231, as shown in the virtual model shown in FIG. 31, the magnetic field formed by the first magnet 24 may be distorted by the central magnetic shielding plate 231. In the case where the magnetic field is distorted in the vicinity of the central magnetic shielding plate 231, the magnetic field detected by the first magnetic field sensor 232 positioned in the vicinity of the central magnetic shielding plate 231 may be affected, which may become a disturbance factor that reduces detection accuracy.

Figure 32:
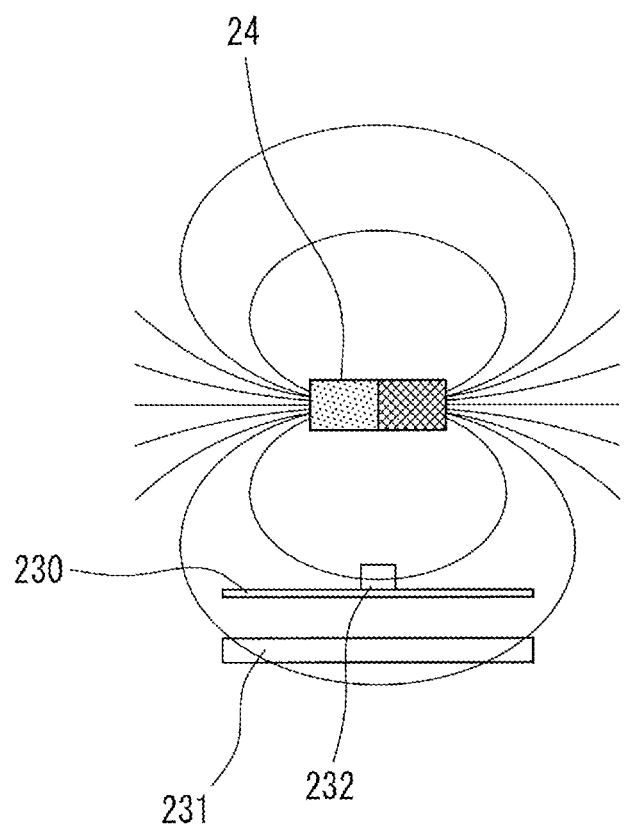
FIG. 32 is a view conceptually illustrating an example of the magnetic field formed by the first magnet.

FIG. 32 is a view conceptually illustrating an example of the magnetic field formed by the first magnet 24. FIG. 32 conceptually shows a virtual model in which the central magnetic shielding plate 231 is spaced apart from the first connection line 230 and the first magnetic field sensor 232. As illustrated in FIG. 32, in the case where the central magnetic shielding plate 231 and the first magnetic field sensor 232 are spaced apart from each other, even if the magnetic field is distorted in the vicinity of the central magnetic shielding plate 231, it is possible to suppress the influence on the magnetic field detected by the first magnetic field sensor 232, which is spaced apart from the central magnetic shielding plate 231.

As described above, in the detection device 2 according to the tenth embodiment of the present application, the central magnetic shielding plate 231 is spaced apart from the first magnetic field sensor 232 and the second magnetic field sensor 233 by the first spacer member 234 and the second spacer member 235. Accordingly, the detection device 2 according to the present application can suppress the influence due to distortion in the magnetic field caused by the central magnetic shielding plate 231.

Figure 33:
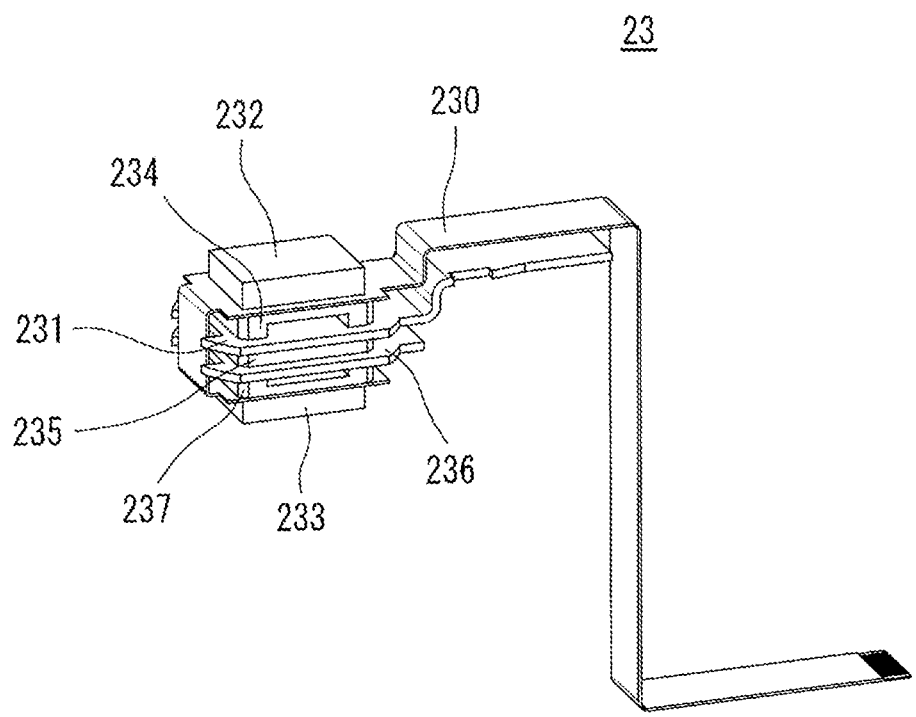
FIG. 33 is a schematic perspective view showing an example of the magnetic field detection unit included in the detection device according to the present application.

FIG. 33 is a schematic perspective view showing an example of the magnetic field detection unit 23 included in the detection device 2 according to the present application. FIG. 33 shows a modification example of the detection device 2 according to the tenth embodiment. In the magnetic field detection unit 23 illustrated in FIG. 33, the first spacer member 234 is arranged between the upper surface of the central magnetic shielding plate 231 and the first connection line 230, and the first magnetic field sensor 232 is arranged on the upper surface of the first connection line 230. Further, the second spacer member 235 is arranged on the lower surface of the central magnetic shielding plate 231. Furthermore, an auxiliary magnetic shielding plate 236 is arranged on the lower surface of the second spacer member 235, a third spacer member 237 is arranged on the lower surface of the auxiliary magnetic shielding plate 236, and further, the second magnetic field sensor 233 is arranged on the lower surface of the third spacer member 237 via the first connection line 230.

As described above, the detection device 2 according to the tenth embodiment of the present application is modified in various forms and achieves excellent effects such as being capable of suppressing the influence due to distortion in the magnetic field caused by the central magnetic shielding plate 231.

<Correction Process>

Figure 34:
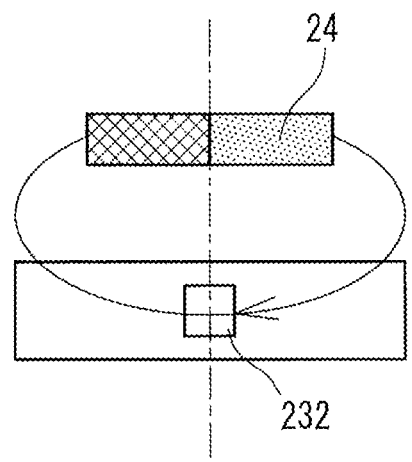
FIG. 34 is a schematic view schematically illustrating an example of the relationship between the first magnet, a first magnetic field sensor, and the magnetic field due to the first magnet included in the detection device according to the present application.
Figure 35:
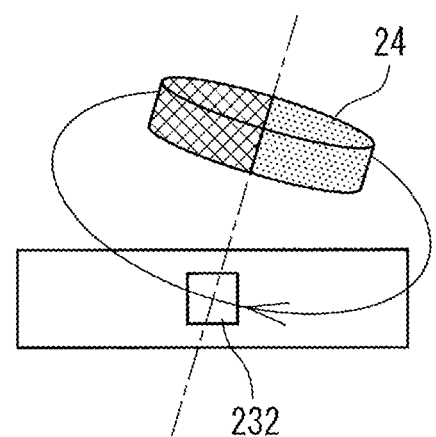
FIG. 35 is a schematic view schematically illustrating an example of the relationship between the first magnet, the first magnetic field sensor, and the magnetic field due to the first magnet included in the detection device according to the present application.

Next, an example of a correction process of the operation device 1 and the detection device 2 according to the present application will be described. FIG. 34 and FIG. 35 are schematic views schematically illustrating an example of the relationship between the first magnet 24, the first magnetic field sensor 232, and the magnetic field due to the first magnet 24 included in the detection device 2 according to the present application. FIG. 34 shows a state in which the shaft member 20 is at the reference position and the central axis is vertical, and FIG. 35 shows a state in which the shaft member 20 tilts from the reference position and the central axis is not vertical. The arrows in FIG. 34 and FIG. 35 indicate the orientation of the magnetic lines of force forming the magnetic field. As illustrated in FIG. 34, in the case where the shaft member 20 is at the reference position and the direction of the magnetic poles of the first magnet 24 is perpendicular to the direction of the central axis, the first magnetic field sensor 232 can accurately detect the rotation angle of the shaft member 20 based on the detected magnetic field. However, as illustrated in FIG. 35, if the magnetic pole direction of the first magnet 24 tilts and the generated magnetic field tilts together with tilting of the shaft member 20, an error may occur in the detection of the rotation angle of the shaft member 20. Thus, correction is required in the case of detecting a rotation angle in the tilted state of the shaft member 20.

Figure 36:
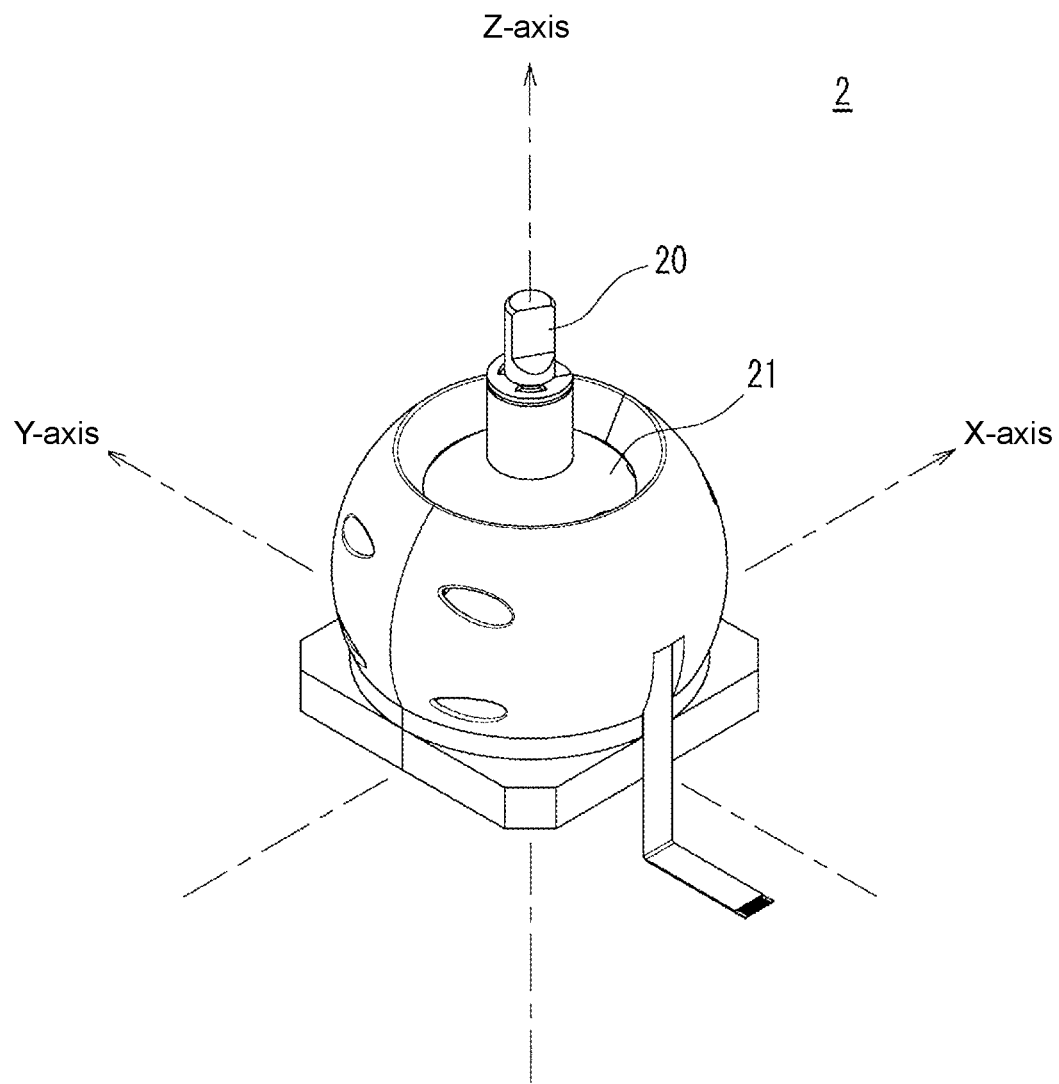
FIG. 36 is a view illustrating virtual coordinate axes used for describing the action of the detection device according to the present application.
Figure 37:
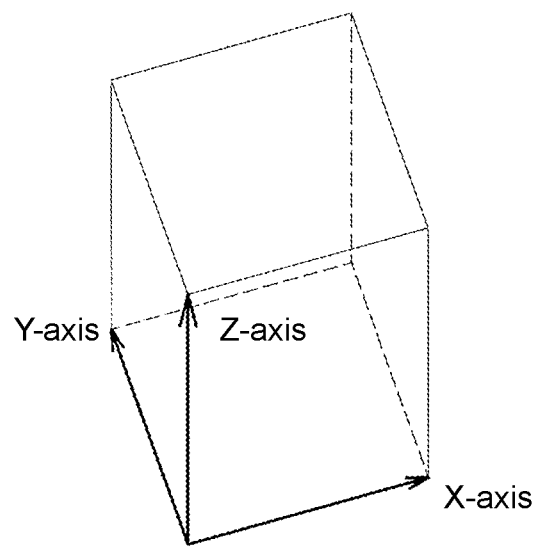
FIG. 37 is a model showing the direction of the shaft member and the like of the detection device according to the present application on the virtual coordinate axes.
Figure 38:
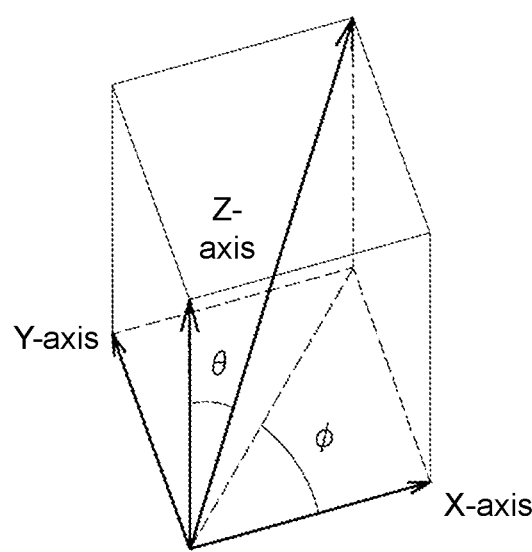
FIG. 38 is a model showing the direction of the shaft member and the like of the detection device according to the present application on the virtual coordinate axes.

FIG. 36 is a view illustrating virtual coordinate axes used for describing the detection device 2 according to the present application and its action. FIG. 37 and FIG. 38 are models showing the direction of the shaft member 20 and the like of the detection device 2 according to the present application on the virtual coordinate axes. FIG. 36 shows a state in which the shaft member 20 and the spherical body 21 of the detection device 2 are at the reference position, superimposed on virtual coordinate axes indicated by an X-axis, a Y-axis, and a Z-axis. FIG. 37 shows the coordinate axes from which the detection device 2 is excluded from FIG. 36. FIG. 38 shows tilting of the shaft member 20 and the spherical body 21 as vectors. In FIG. 38, a vector pointing from the tilting center of the shaft member 20 to the operation part 12 side (upper side) is superimposed on the virtual coordinate axes shown in FIG. 37 as an axis vector, showing a state in which the shaft member 20 and the spherical body 21 are tilted from the reference position.

Referring to FIG. 36 to FIG. 38, the correction will be described. As illustrated in FIG. 36 and FIG. 37, in the following description, a horizontal plane is defined as a plane specified by the X-axis and the Y-axis, and a vertical direction is defined as the Z-axis direction. As shown in FIG. 38, in the case where the shaft member 20 and the spherical body 21 are tilted, the angle related to the tilting indicated by the axis vector is indicated by an angle $\phi$ counterclockwise from the X-axis projected onto the XY plane, and an angle $\theta$ indicating the inclination from the Z-axis.

Figure 39:
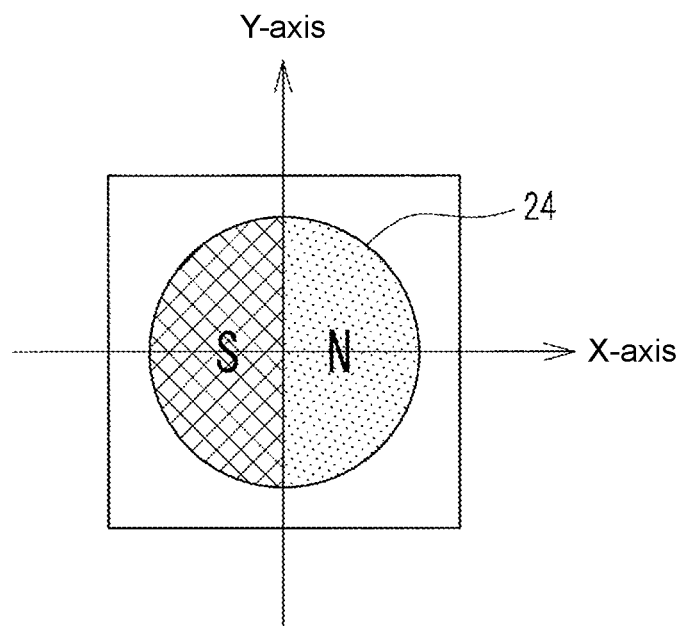
FIG. 39 is a view illustrating virtual coordinate axes used for describing the action of the detection device according to the present application.
Figure 40:
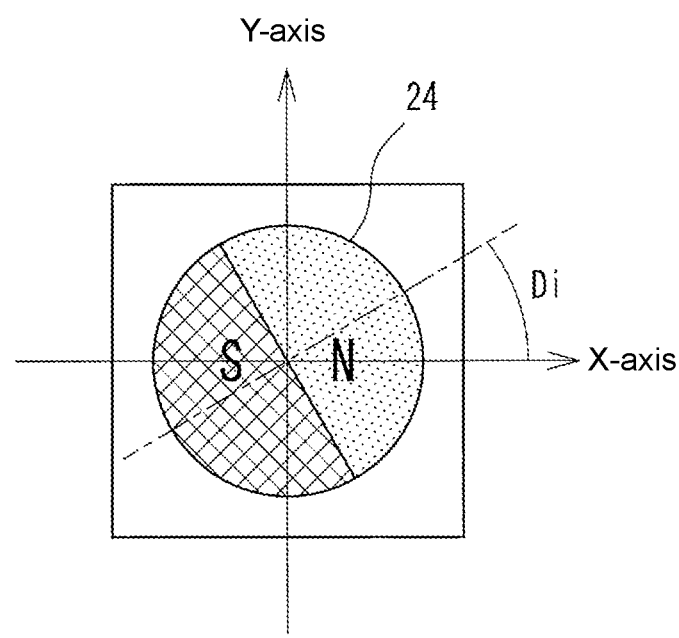
FIG. 40 is a view illustrating virtual coordinate axes used for describing the action of the detection device according to the present application.

FIG. 39 and FIG. 40 are views illustrating virtual coordinate axes used for describing the action of the detection device 2 according to the present application. FIG. 39 and FIG. 40 show the virtual coordinate system defined in the present application in a viewpoint from the positive direction (above) of the Z-axis, and show the magnetic poles of the first magnet 24 superimposed on the coordinate axes. FIG. 39 shows a state in which the shaft member 20 of the detection device 2 is at the reference position, and FIG. 40 shows a state in which the shaft member 20 is rotated from the reference position. As shown in FIG. 40, the angle of the rotation position of the shaft member 20 is defined as an angle Di based on the counterclockwise direction. The angle related to rotation is defined by a change in the direction of a normal vector (hereinafter referred to as a "magnetic pole vector") on the N-pole side of the first magnet 24, which can approximate an emission direction of magnetic lines of force.

Figure 41:
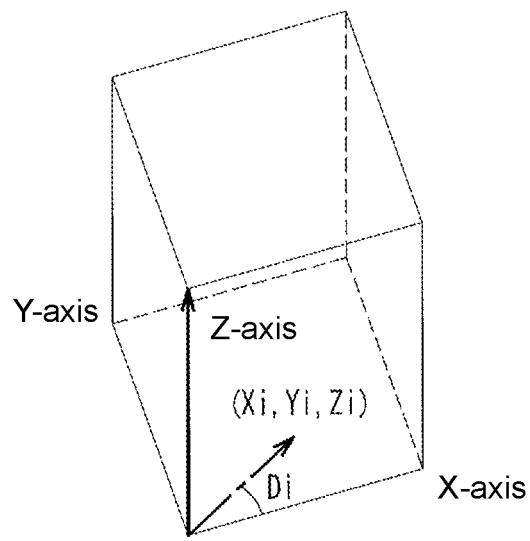
FIG. 41 is a model showing the direction of the shaft member and the like of the detection device according to the present application on the virtual coordinate axes.
Figure 42:
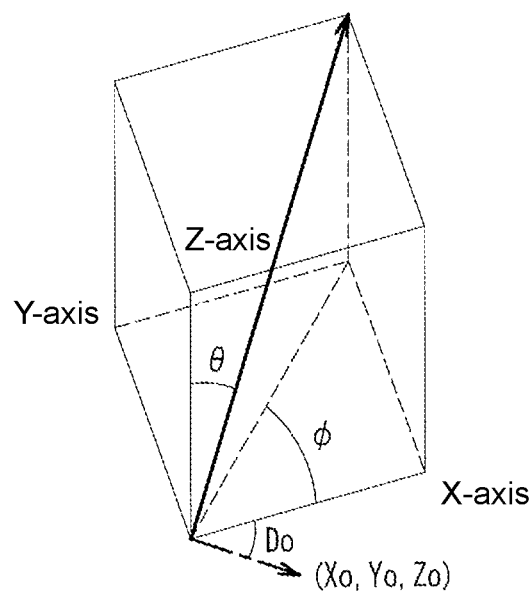
FIG. 42 is a model showing the direction of the shaft member and the like of the detection device according to the present application on the virtual coordinate axes.

FIG. 41 and FIG. 42 are models showing the direction of the shaft member 20 and the like of the detection device 2 of the present application on virtual coordinate axes. FIG. 41 and FIG. 42 are generalized models of the actions of the shaft member 20 and the spherical body 21, where FIG. 41 shows an initial state in which the shaft member 20 and the like are not tilted, and FIG. 42 shows a tilted state. As shown in FIG. 42, the axis vector in the tilted state is tilted at an angle θ from the Z-axis, in a direction of an angle φ counterclockwise from the X-axis projected onto the XY plane. In FIG. 41 and FIG. 42, the arrow in a solid line is an axis vector, and the arrow in a dot-dashed line is a magnetic pole vector. The coordinates in the initial state of the magnetic pole vector shown in FIG. 41 are defined as (Xi, Yi, Zi), and the coordinates in the tilted state of the magnetic pole vector shown in FIG. 42 are defined as (Xo, Yo, Zo). As shown in FIG. 42, the tilting angle of the shaft member 20 and the like is indicated by the angle φ counterclockwise from the X-axis projected onto the XY plane and the angle θ indicating the inclination from the Z-axis. Further, in the initial state shown in FIG. 41, the angle of the magnetic pole vector detected by the first magnetic field sensor 232 is indicated as the angle Di counterclockwise from the X-axis on the XY plane, and in the tilted state shown in FIG. 42, the angle of the magnetic pole vector detected by the first magnetic field sensor 232 is indicated as an angle Do.

In the present application, a method of decomposing a change in the axis vector accompanying the action of the shaft member 20 and the like in the action from FIG. 41 to FIG. 42 to derive a change in the magnetic pole vector will be illustrated and described. FIG. 43 to FIG. 46 are models showing the direction of the shaft member 20 and the like of the detection device 2 according to the present application on virtual coordinate axes.

Figure 43:
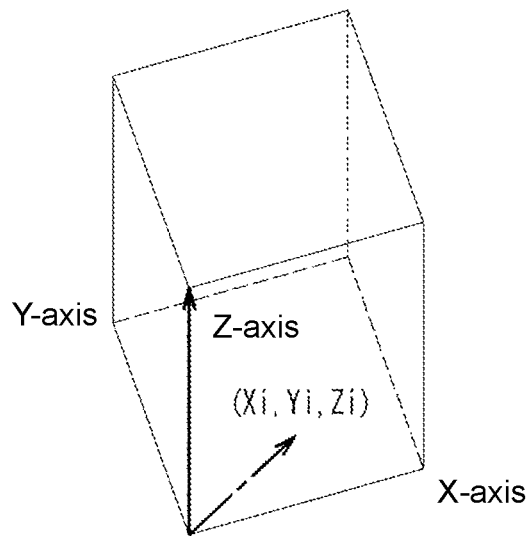
FIG. 43 is a model showing the direction of the shaft member and the like of the detection device according to the present application on the virtual coordinate axes.
Figure 44:
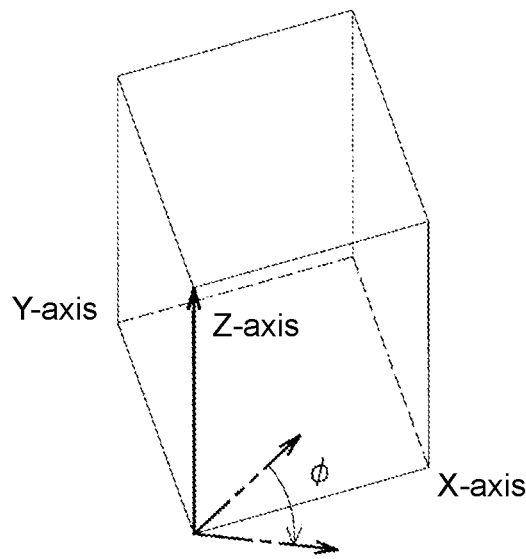
FIG. 44 is a model showing the direction of the shaft member and the like of the detection device according to the present application on the virtual coordinate axes.
Figure 45:
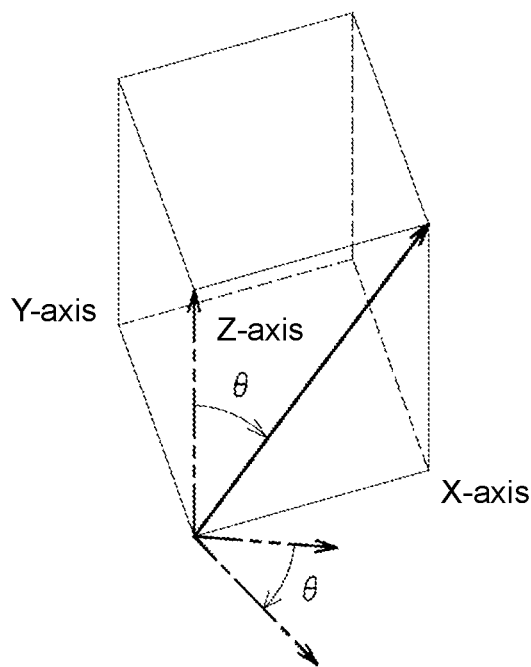
FIG. 45 is a model showing the direction of the shaft member and the like of the detection device according to the present application on the virtual coordinate axes.
Figure 46:
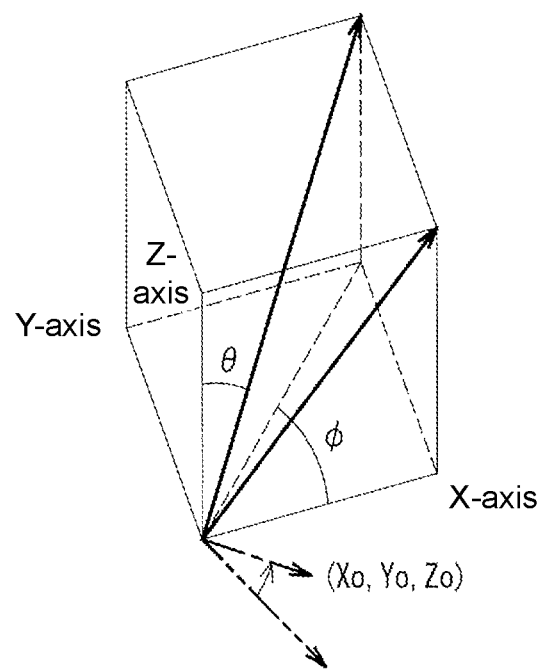
FIG. 46 is a model showing the direction of the shaft member and the like of the detection device according to the present application on the virtual coordinate axes.

FIG. 43 shows an initial state, in which the axis vector is at the reference position along the Z-axis. FIG. 44 shows a component in which the magnetic pole vector rotates clockwise by an angle φ on the XY plane, extracted from among the change in the axis vector and the magnetic pole vector in the tilted state illustrated in FIG. 42. Hereinafter, the action from the state in FIG. 43 to the state in FIG. 44 will be referred to as a first action. FIG. 45 shows, as a change from FIG. 44, a component in which the axis vector tilts by an angle θ to the X-axis direction with respect to the Z-axis on the XZ plane, among the change in the axis vector and the magnetic pole vector in the tilted state illustrated in FIG. 42. With the axis vector tilting, the magnetic pole vector projected onto the XY plane also rotates clockwise with respect to the Y-axis. Hereinafter, the action from the state in FIG. 44 to the state in FIG. 45 will be referred to as a second action. FIG. 46 shows, as a change from FIG. 45, a component in which the axis vector rotates counterclockwise by an angle φ around the Z-axis, among the change in the axis vector and the magnetic pole vector in the tilted state illustrated in FIG. 42. With the axis vector rotating around the Z-axis, the magnetic pole vector projected onto the XY plane also rotates counterclockwise. Hereinafter, the action from the state in FIG. 45 to the state in FIG. 46 will be referred to as a third action. As described above, the action from FIG. 41 to FIG. 42 may be decomposed into a combination of the first action, the second action, and the third action from FIG. 43 to FIG. 46.

The transformation from the coordinates (Xi, Yi, Zi) of the magnetic pole vector in the initial state shown in FIG. 41 into the coordinates (Xo, Yo, Zo) of the magnetic pole vector in the tilted state shown in FIG. 42 may be represented as Formula 1 below presented as a determinant. In Formula 1 below, the fourth matrix on the right side represents the coordinates in the initial state. The third matrix on the right side represents a transformation matrix that expresses the first action of rotating clockwise by an angle φ with respect to the Z-axis. In Formula 1, the second matrix on the right side represents a transformation matrix that expresses the second action of rotating clockwise by an angle θ with respect to the Y-axis. In Formula 1, the first matrix on the right side represents a transformation matrix that expresses the third action of rotating counterclockwise by an angle φ with respect to the Z-axis. As described above, Formula 1 is a determinant that performs transformations related to the first action, the second action, and the third action on the coordinates (Xi, Yi, Zi) of the magnetic pole vector in the initial state to transform into the coordinates (Xo, Yo, Zo) of the magnetic pole vector in the tilted state.

[Math. 1]

$$\begin{pmatrix} Xo \\ Yo \\ Zo \end{pmatrix} = \overset{Z\text{-axis rotate}}{\underset{\text{counterclockwise by } \phi}{\begin{pmatrix} \cos(\phi) & \sin(\phi) & 0 \\ -\sin(\phi) & \cos(\phi) & 0 \\ 0 & 0 & 1 \end{pmatrix}}}$$

$$\overset{Y\text{-axis rotate clockwise}}{\underset{\text{by } \theta}{\begin{pmatrix} \cos(-\theta) & 0 & -\sin(-\theta) \\ 0 & 1 & 0 \\ \sin(-\theta) & 0 & \cos(-\theta) \end{pmatrix}}} \overset{Z\text{-axis rotate clockwise}}{\underset{\text{by } \phi}{\begin{pmatrix} \cos(-\phi) & \sin(-\phi) & 0 \\ -\sin(-\phi) & \cos(-\phi) & 0 \\ 0 & 0 & 1 \end{pmatrix}}} \begin{pmatrix} Xi \\ Yi \\ Zi \end{pmatrix}$$

Formula 1 where (Xi, Yi, Zi): coordinates of magnetic pole vector in initial state (Xo, Yo, Zo): coordinates of magnetic pole vector in tilted state.

Upon obtaining the inclination of the magnetic pole vector, the angle of the magnetic pole vector projected onto the XY plane detected by the first magnetic field sensor 232 can be obtained using inverse trigonometric functions according to Formula 2 and Formula 3 below.

$Di = \arctan(Yi/Xi)$  Formula 2

$Do = \arctan(Yo/Xo)$  Formula 3

A measurement error arises from the difference between the angle Di of the magnetic pole vector in the initial state obtained according to Formula 2 above and the angle Do of the magnetic pole vector in the tilted state obtained according to Formula 3 above.

FIG. 47 is a chart comparing and showing an example of the difference due to tilting in the detected value of the angle of the magnetic lines of force (magnetic pole vector) detected by the first magnetic field sensor 232 included in the detection device 2 of the present application. FIG. 47 compares and shows the relationship between the angle Di which is a calculated value of the magnetic pole vector detected in the initial state in which the axis vector representing the longitudinal direction of the shaft member 20 and the like coincides with the Z-axis, and the angle Do which is a calculated value of the magnetic pole vector detected in the tilted state of the axis vector. FIG. 47 shows the relationship between the angle Di and the angle Do in the case where the angle θ from the X-axis of the tilted shaft member 20 is 30° and the angle θ from the Z-axis is 45°. In FIG. 47, the upper part shows the angle Di of the magnetic pole vector detected by the first magnetic field sensor 232, and the lower part shows the angle Do. As illustrated in FIG. 47, since there is a difference in the values of Di and Do, it is required to perform a process to correct this difference.

Figure 48:
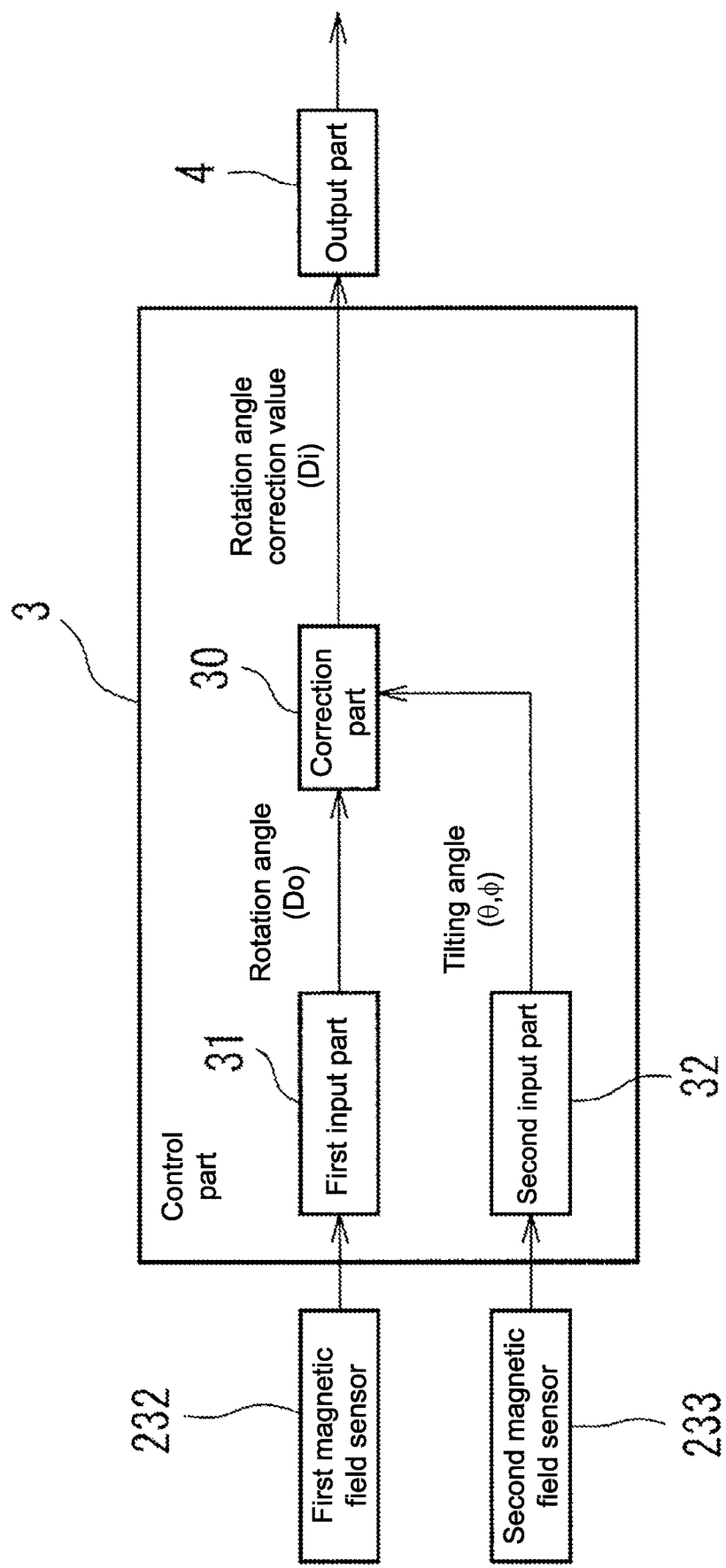
FIG. 48 is a block diagram showing a functional configuration example of the operation device according to the present application.

FIG. 48 is a block diagram showing a functional configuration example of the operation device 1 according to the present application. The operation device 1 includes a control part 3 configured using various electronic devices, various electric circuits, and electronic components such as a microcomputer. The control part 3 includes a first input part 31 that receives an input from the first magnetic field sensor 232 and a second input part 32 that receives an input from the second magnetic field sensor 233, and functions as a correction part 30 that corrects the rotation angle.

The first input part 31 receives an input of a measured value (Do) of the rotation angle from the first magnetic field sensor 232, which detects a change in the magnetic field based on the magnetic pole vector as the rotation angle of the shaft member 20. The second input part 32 receives an input of a measured value (θ, ϕ) of the tilting angle from the second magnetic field sensor 233, which detects a change in the magnetic field based on the axis vector as the tilting angle of the shaft member 20.

Based on the determinant and calculation formula described above, the correction part 30 derives a correction value (Di) of the rotation angle from the measured value (Do) of the rotation angle and the measured value (θ, ϕ) of the tilting angle. The derivation of the correction value (Di) of the rotation angle from the measured value (Do) of the rotation angle and the measured value (θ, ϕ) of the tilting angle is calculated, for example, by performing inverse calculation of the determinant shown as Formula 1. Formula 4 is an inverse calculation formula of the determinant shown as Formula 1.

[Math. 2]

$$\begin{pmatrix} Xi \\ Yi \\ Zi \end{pmatrix} = \overset{\text{Z-axis rotate}}{\overset{\text{counterclockwise by } \phi}{\begin{pmatrix} \cos(\phi) & \sin(\phi) & 0 \\ -\sin(\phi) & \cos(\phi) & 0 \\ 0 & 0 & 1 \end{pmatrix}}}$$

$$\overset{\text{Y-axis rotate}}{\overset{\text{counterclockwise by } \theta}{\begin{pmatrix} \cos(\theta) & 0 & -\sin(\theta) \\ 0 & 1 & 0 \\ \sin(\theta) & 0 & \cos(\theta) \end{pmatrix}}} \overset{\text{Z-axis rotate clockwise}}{\overset{\text{by } \phi}{\begin{pmatrix} \cos(-\phi) & \sin(-\phi) & 0 \\ -\sin(-\phi) & \cos(-\phi) & 0 \\ 0 & 0 & 1 \end{pmatrix}}} \begin{pmatrix} Xo \\ Yo \\ Zo \end{pmatrix} \quad \text{Formula 4}$$

The correction part 30, for example, outputs the correction value (Di) of the rotation angle derived using Formula 4 to an output part 4. In the correction part 30, an operation signal based on the correction value is outputted from the output part 4 to a device that is the operation target, such as a game console, a personal computer, or an industrial robot. The correction in the correction part 30 may be performed according to calculation based on the determinant and calculation formula, or may be performed by creating a table showing a chart as illustrated in FIG. 47 for each tilting angle in advance and correcting by conversion using the table. The control part 3 itself may be incorporated in either the detection device 2 or the operation device 1.

Figure 49:
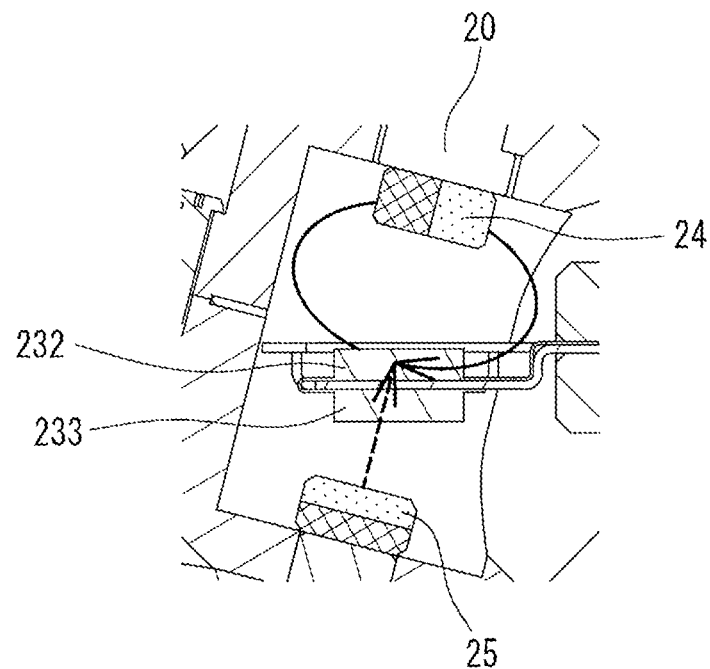
FIG. 49 is a schematic view schematically illustrating an example of the magnetic lines of force of the first magnet and the second magnet detected by the first magnetic field sensor and the second magnetic field sensor included in the detection device according to the present application.
Figure 50:
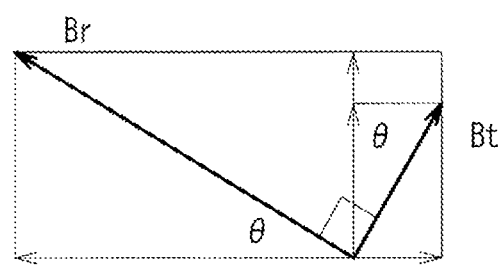
FIG. 50 is a model showing the direction of the magnetic lines of force due to the first magnet and the second magnet included in the detection device according to the present application.

Next, an example of another correction process of the operation device 1 and the detection device 2 according to the present application will be described. FIG. 49 is a schematic view schematically illustrating an example of magnetic lines of force of the first magnet 24 and the second magnet 25 detected by the first magnetic field sensor 232 and the second magnetic field sensor 233 included in the detection device 2 according to the present application. FIG. 50 is a model showing the direction of magnetic lines of force of the first magnet 24 and the second magnet 25 included in the detection device 2 according to the present application. In FIG. 49 and FIG. 50, among the magnetic lines of force detected by the first magnetic field sensor 232 and the second magnetic field sensor 233, the solid line indicates the magnetic lines of force due to the first magnet 24, and the dot-dashed line indicates the magnetic lines of force due to the second magnet 25. FIG. 49 shows a state in which the shaft member 20 and the spherical body 21 are tilted. According to the state shown in FIG. 49, FIG. 50 shows a model showing a magnetic flux density Br based on the magnetic lines of force due to the first magnet 24 used for detecting the rotation action of the shaft member 20 and the like, and a magnetic flux density Bt based on the magnetic lines of force due to the second magnet 25 used for detecting the tilting action of the shaft member 20 and the like. As shown in FIG. 50, since the magnetic flux density Br due to the first magnet 24 detected by the first magnetic field sensor 232 is affected by the tilting angle θ, a correction process is also required for the magnetic flux density.

Figure 51:
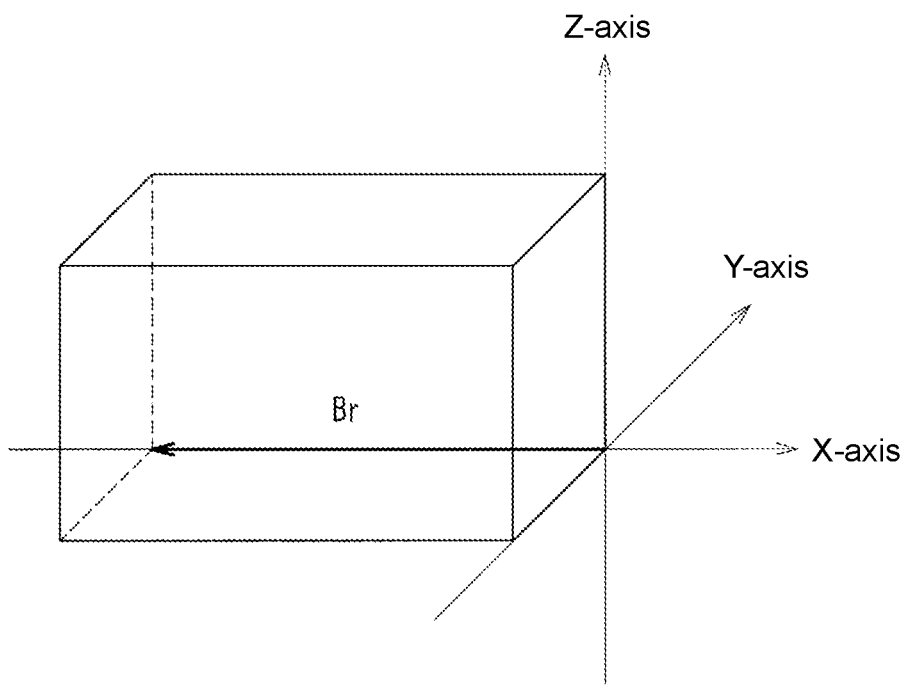
FIG. 51 is a model showing the direction of the magnetic flux density due to the first magnet detected by the first magnetic field sensor included in the detection device according to the present application on virtual coordinate axes.
Figure 52:
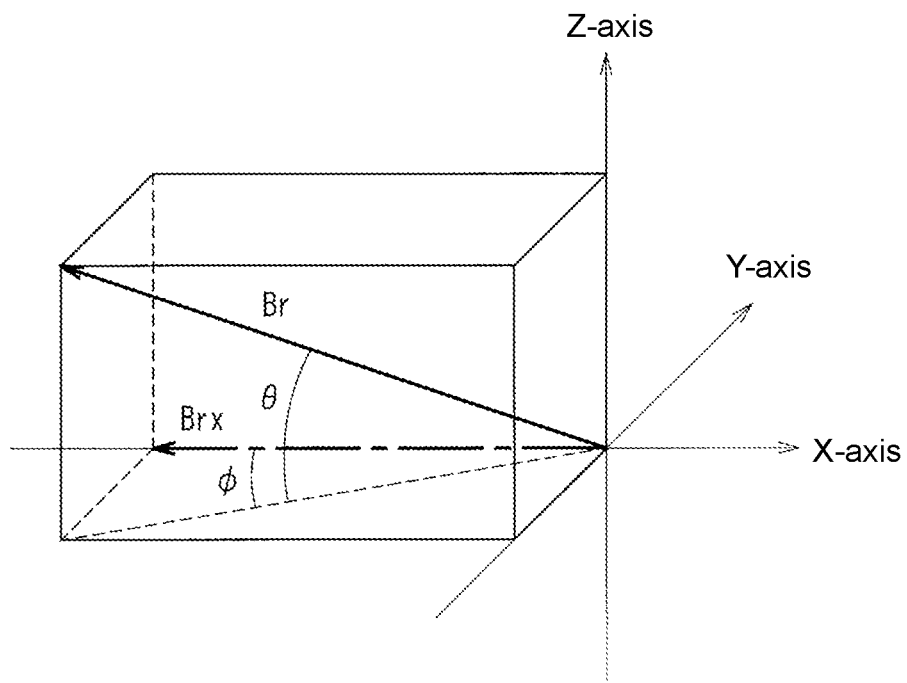
FIG. 52 is a model showing the direction of the magnetic flux density due to the first magnet detected by the first magnetic field sensor included in the detection device according to the present application on the virtual coordinate axes.

FIG. 51 and FIG. 52 are models showing, on virtual coordinate axes, the direction of the magnetic flux density due to the first magnet 24 detected by the first magnetic field sensor 232 included in the detection device 2 according to the present application. FIG. 51 shows an initial state in which the shaft member 20 and the spherical body 21 of the detection device 2 are at the reference position, and FIG. 52 shows a tilted state in which the shaft member 20 and the like are tilted. Among the X-axis direction component of the magnetic flux density detected by the first magnetic field sensor 232, the X-axis direction component of the magnetic flux density due to the first magnet 24 used for detecting the rotation of the shaft member 20 will be described.

In the initial state shown in FIG. 51, an X-axis direction component Brx of a magnetic flux density Br due to the first magnet 24 detected by the first magnetic field sensor 232 is detected by the first magnetic field sensor 232 as having a magnitude of −Br. That is, Brx=−Br.

In the tilted state shown in FIG. 52, the X-axis direction component Brx of the magnetic flux density Br due to the first magnet 24 detected by the first magnetic field sensor 232 is detected by the first magnetic field sensor 232 as having a magnitude of −Br cos θ·cos ϕ using the angle ϕ from the X-axis and the angle θ from the XY plane. That is, Brx=−Br cos θ·cos ϕ.

Figure 53:
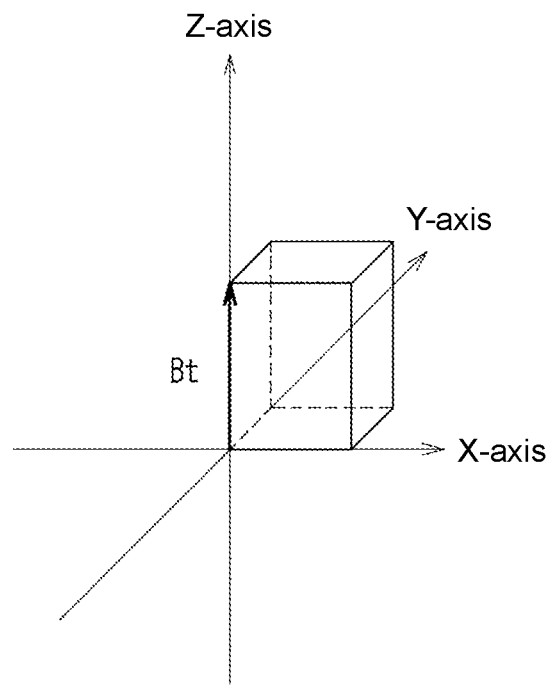
FIG. 53 is a model showing the direction of the magnetic flux density due to the second magnet detected by the second magnetic field sensor included in the detection device according to the present application on the virtual coordinate axes.
Figure 54:
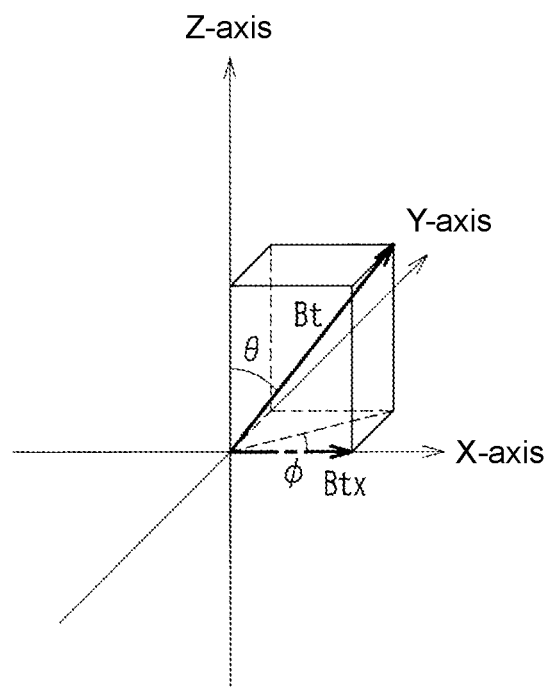
FIG. 54 is a model showing the direction of the magnetic flux density due to the second magnet detected by the second magnetic field sensor included in the detection device according to the present application on the virtual coordinate axes.

FIG. 53 and FIG. 54 are models showing, on virtual coordinate axes, the direction of the magnetic flux density due to the second magnet 25 detected by the second magnetic field sensor 233 included in the detection device 2 according to the present application. FIG. 53 shows an initial state, and FIG. 54 shows a tilted state. Among the X-axis direction component of the magnetic flux density detected by the second magnetic field sensor 233, the X-axis direction component of the magnetic flux density due to the second magnet 25 used for detecting the tilting of the shaft member 20 will be described.

In the initial state shown in FIG. 53, an X-axis direction component Btx of a magnetic flux density Bt due to the second magnet 25 detected by the second magnetic field sensor 233 is detected by the second magnetic field sensor 233 as having a magnitude of 0. That is, Btx=0.

In the tilted state shown in FIG. 54, the X-axis direction component Btx of the magnetic flux density Bt due to the second magnet 25 detected by the second magnetic field sensor 233 is detected by the second magnetic field sensor 233 as having a magnitude of Bt sin θ·cos φ using the angle φ from the X-axis and the angle θ from the XY plane. That is, Brx=Bt sin θ·cos φ.

Figure 55:
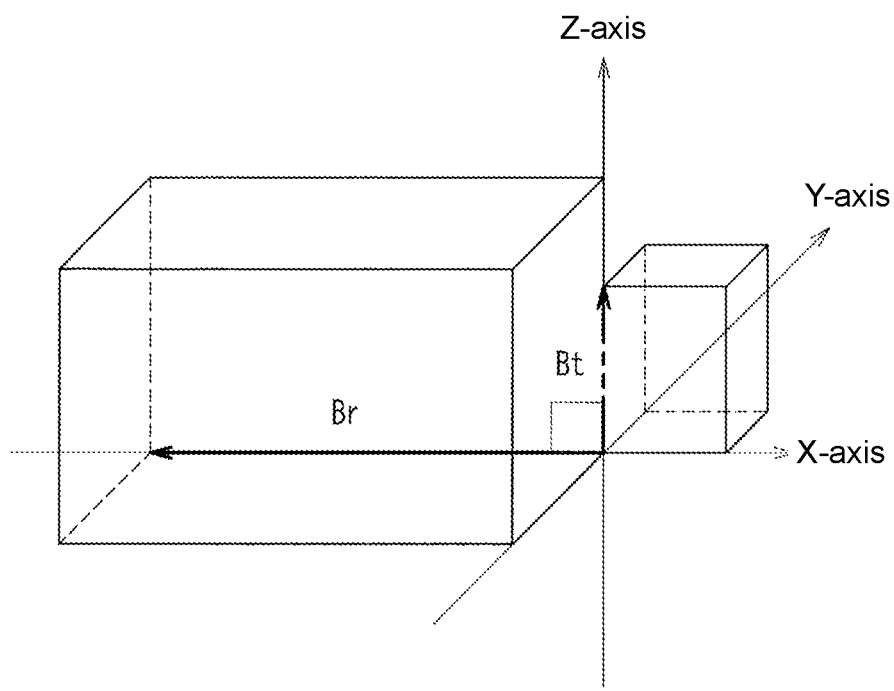
FIG. 55 is a model showing the direction of the magnetic flux density due to the first magnet detected by the first magnetic field sensor and the direction of the magnetic flux density due to the second magnet detected by the second magnetic field sensor included in the detection device according to the present application on the virtual coordinate axes.
Figure 56:
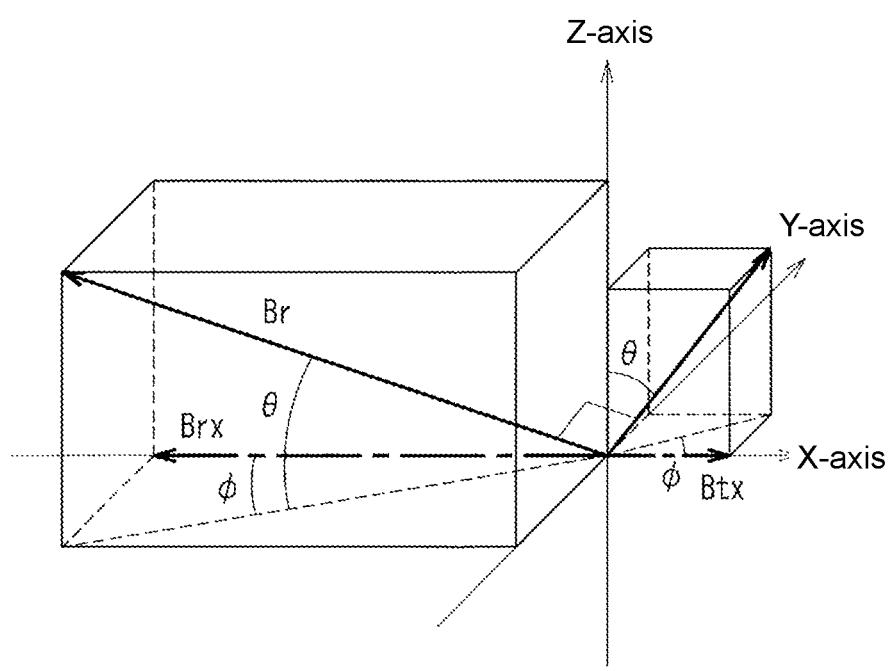
FIG. 56 is a model showing the direction of the magnetic flux density due to the first magnet detected by the first magnetic field sensor and the direction of the magnetic flux density due to the second magnet detected by the second magnetic field sensor included in the detection device according to the present application on the virtual coordinate axes.

FIG. 55 and FIG. 56 are models showing, on virtual coordinate axes, the direction of the magnetic flux density due to the first magnet 24 detected by the first magnetic field sensor 232 included in the detection device 2 according to the present application, and the direction of the magnetic flux density due to the second magnet 25 detected by the second magnetic field sensor 233. FIG. 55 shows an initial state, and FIG. 56 shows a tilted state. In FIG. 55 and FIG. 56, an overlap between the magnetic flux density due to the first magnet 24 and the magnetic flux density due to the second magnet 25 is detected by the first magnetic field sensor 232 and the second magnetic field sensor 233.

In the initial state shown in FIG. 55, a magnetic flux density Bx, which is the overlap between the X-axis direction component Brx of the magnetic flux density of the first magnet 24 and the X-axis direction component Btx of the magnetic flux density of the second magnet 25, is detected as −Br. That is, Bx=−Br.

In the tilted state shown in FIG. 56, the magnetic flux density Bx, which is the overlap between the X-axis direction component Brx of the magnetic flux density of the first magnet 24 and the X-axis direction component Btx of the magnetic flux density of the second magnet 25, is Bt sin θ·cos φ−Br cos θ·cos φ. That is, Bx=Bt sin θ·cos φ−Br cos θ·cos φ.

As described above, since there is a difference in the magnetic flux density Bx between the initial state and the tilted state, it is required to perform a process to correct this difference.

Figure 57:
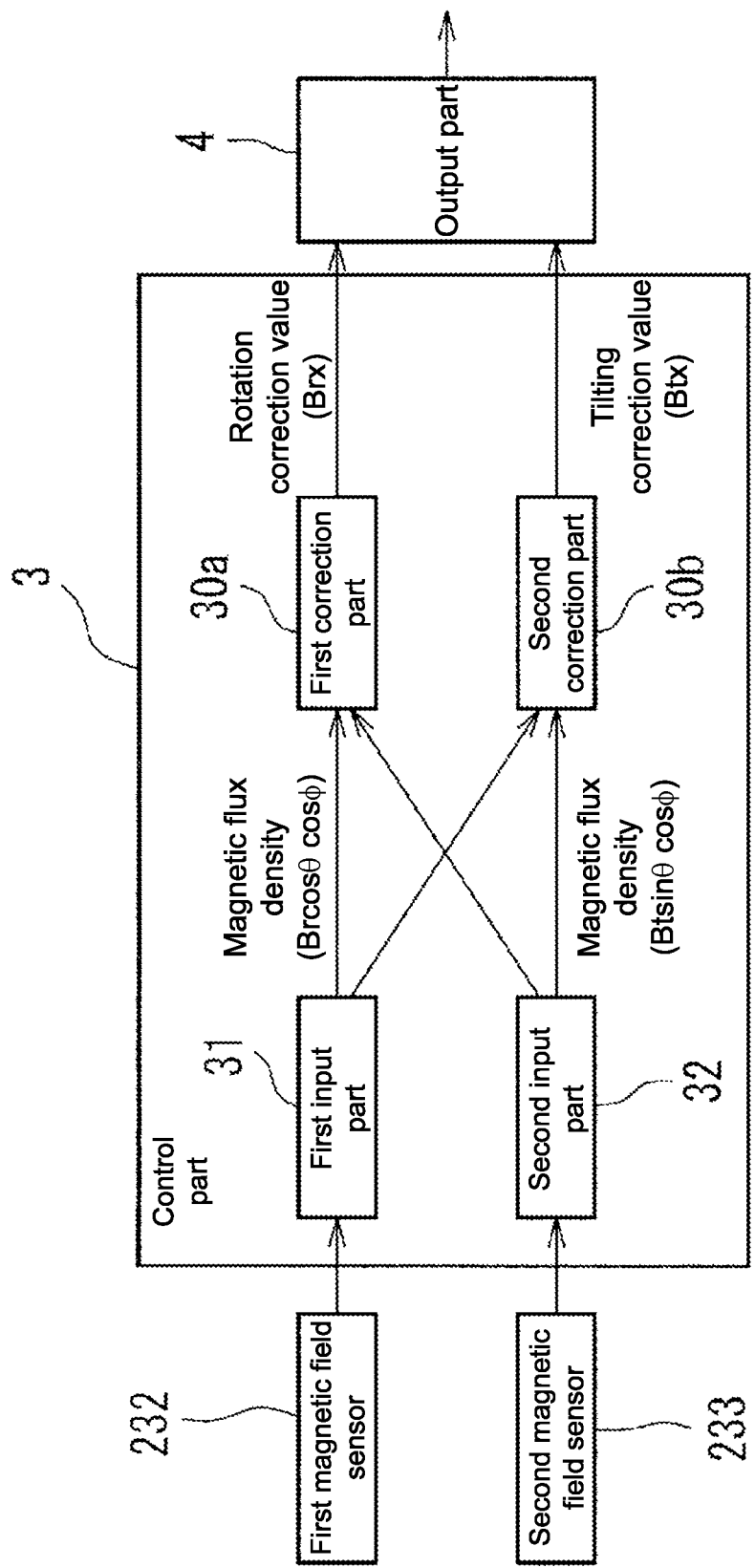
FIG. 57 is a block diagram showing a functional configuration example of the operation device according to the present application.

FIG. 57 is a block diagram showing a functional configuration example of the operation device 1 according to the present application. The operation device 1 includes a control part 3, which functions as a first input part 31 and a second input part 32, as well as a first correction part 30a that corrects the rotation angle and a second correction part 30b that corrects the tilting angle.

The first input part 31 receives an input of a magnetic flux density Br cos θ·cos φ due to the first magnet 24 from the first magnetic field sensor 232 used for detecting rotation. The second input part 32 receives an input of a magnetic flux density Bt sin θ·cos φ due to the second magnet 25 from the second magnetic field sensor 233 used for detecting tilting.

The first correction part 30a derives a correction value Brx in the X-axis direction related to rotation based on the magnetic flux density Br cos θ·cos φ related to rotation detected by the first magnetic field sensor 232 and the magnetic flux density Bt sin θ·cos φ related to tilting detected by the second magnetic field sensor 233. The second correction part 30b derives a correction value Btx in the X-axis direction related to tilting based on the magnetic flux density Br cos θ·cos φ related to rotation detected by the second magnetic field sensor 233 and the magnetic flux density Bt sin θ·cos φ related to tilting detected by the second magnetic field sensor 233.

The first correction part 30a and the second correction part 30b output the derived correction value Brx related to rotation and the derived correction value Btx related to tilting to an output part 4. In the correction part 30, an operation signal based on the correction value is outputted from the output part 4 to a device which is the operation target, such as a game console, a personal computer, or an industrial robot. The correction in the correction part 30 may be performed according to calculation based on the calculation formula above, or by creating a table recording calculation results for each tilting angle in advance and correcting by conversion using the table.

As described above, the detection device 2 and the operation device 1 according to the present application include magnets such as the first magnet 24 and the second magnet 25 and the magnetic field detection unit 23, and the magnetic lines of force due to the magnetic fields generated by the magnets are detected by magnetic field sensors included in the magnetic field detection unit 23. Then, various actions such as tilting, rotation, and up-down movement of the shaft member 20 are detected based on the detected magnetic fields. Since the detection device 2 and the like according to the present application detect actions based on the magnetic fields, for example, it is not required to use a sliding variable resistor for detecting actions, and excellent effects such as being capable of suppressing frictional degradation and improving reliability are achieved.

Further, in the detection device 2 and the like according to the present application, magnets such as the first magnet 24 and the second magnet 25 are arranged on the side of the spherical body 21 which acts, and magnetic field sensors such as the first magnetic field sensor 232 and the second magnetic field sensor 233 which require wiring are arranged at fixed positions in the spherical body 21. Thus, in the detection device 2 and the like according to the present application, abnormalities such as disconnection due to the action of the spherical body 21 are less likely to occur, and excellent effects such as being capable of improving reliability are achieved.

The present invention is not limited to the embodiments described above and may be implemented according to various other embodiments. Thus, the embodiments described above are simply illustrative in all respects and should not be construed as limiting. The technical scope of the present invention is defined by the claims, and is not bound by the description in the specification. Furthermore, modifications and changes belonging to an equivalent scope of the claims are all covered within the scope of the present invention.

For example, each of the embodiments illustrated as the first embodiment to the tenth embodiment may be appropriately combined and is not limited to being implemented independently.

For example, in the embodiments described above, the application as a game controller has been described, but the present invention is not limited thereto and may be used in the operation of various operation targets such as various toys, various moving bodies, various measuring devices, and industrial robots. Furthermore, the detection device 2 according to the present application may be applied not only to the operation device 1 but also to various devices that can incorporate spherical joints such as joints of industrial robots.

In the embodiments described above, it has been shown that the first magnet 24 is fixed in the vicinity of the center of the spherical body 21, and the first magnetic field sensor 232 is fixed to the shaft member 20. However, as long as the rotation action of the shaft member 20 can be detected, the present invention is not limited thereto, and it is possible to change the fixed position as appropriate. For example, various embodiments may be deployed, such as fixing the magnetic field detection unit 23 at a position affected by the action of the shaft member 20 and fixing the first magnet 24 at a fixed position not affected by the action of the shaft member 20.

Specifically, various embodiments may be deployed, such as fixing the first magnetic field sensor 232 in the vicinity of the center of the spherical body 21 and fixing the first magnet 24 to the shaft member 20. In the case of such configurations, various embodiments may be deployed, such as outputting an electrical signal wirelessly, without being limited to outputting an electrical signal to the outside via the first connection line 230 from the magnetic field detection unit 23 as illustrated in the embodiments above. The same applies to the second magnet 25 and the second magnetic field sensor 233, and as long as the tilting action of the shaft member 20 can be detected, various embodiments may be deployed.

What is claimed is:

1. A detection device which detects an action of a shaft member acting in response to an operation from outside, the detection device comprising:
   a hollow spherical body which has an outer shape formed in a substantially spherical shape and through which the shaft member is inserted;
   a magnet which is fixed inside the spherical body at a position linked with the action of the shaft member; and
   a magnetic field detection unit which is fixed at a position in the vicinity of a center of the spherical body and detects a magnetic field formed by the magnet,
   wherein the shaft member acts with respect to a virtual central axis which is parallel to a longitudinal direction and passes through the center of the spherical body,
   the inside of the spherical body is divided into a first magnetic field chamber and a second magnetic field chamber arranged in a central axis direction,
   the magnet comprises:
   a first magnet which is fixed to the shaft member inserted into the first magnetic field chamber; and
   a second magnet which is fixed in the second magnetic field chamber, and
   the magnetic field detection unit comprises:
   a first magnetic field sensor which detects a magnetic field in the first magnetic field chamber; and
   a second magnetic field sensor which detects a magnetic field in the second magnetic field chamber,
   wherein the detection device further comprises a magnetic shielding plate arranged at a position forming a boundary between the first magnetic field chamber and the second magnetic field chamber.

2. The detection device according to claim 1, comprising at least one of a first spacer member which spaces apart the magnetic shielding plate and the first magnetic field sensor, and a second spacer member which spaces apart the magnetic shielding plate and the second magnetic field sensor.

3. The detection device according to claim 1, wherein the first magnet is arranged such that magnetic poles of the first magnet face a direction perpendicular to the central axis, and
   the second magnet is arranged such that magnetic poles of the second magnet face a direction parallel to the central axis.

4. The detection device according to claim 1, wherein the action of the shaft member is at least one action among an action in which the central axis tilts with the center of the spherical body as a fulcrum, an action of rotating in a circumferential direction around the central axis, and an action of moving in an extending direction of the central axis.

5. The detection device according to claim 1, wherein the shaft member is capable of acting at least in an extending direction of the central axis,
   the spherical body acts in the extending direction in conjunction with the action of the shaft member in the extending direction, and
   the detection device comprises:
   a movable member which moves in conjunction with an action of the spherical body in an axial direction;
   a fixed member which holds the movable member with the movable member being capable of acting;
   a third magnet which is fixed to the movable member; and
   a third magnetic field sensor which is fixed to the fixed member.

6. The detection device according to claim 1, comprising a connection line attached to the magnetic field detection unit, wherein
   an opening through which the connection line is passed inside and outside is provided at the spherical body, and
   the opening is formed in an elongated shape along a large circle passing through intersections between the spherical body and the central axis.

7. The detection device according to claim 1, wherein the shaft member is capable of acting at least in an extending direction of the central axis, and
   the spherical body acts in the extending direction in conjunction with the action of the shaft member in the extending direction, and
   the detection device comprises:
   a movable member which moves in conjunction with an action of the spherical body in the extending direction;
   a fixed member which holds the movable member with the movable member being capable of acting; and
   a pressure sensor which is fixed to the fixed member and detects a pressing based on movement of the movable member.

8. An operation device comprising:
   the detection device according to claim 1; and
   an operation part which receives an operation causing the spherical body included in the detection device to act.

9. The operation device according to claim 8, wherein the action of the shaft member comprises an action in which the central axis tilts with the center of the spherical body as a fulcrum, and an action of rotating in a circumferential direction around the central axis, and
   the operation device comprises a device which corrects a detected value of a rotation action based on a detected value of a tilting action.

10. The operation device according to claim 8, wherein the action of the shaft member comprises an action in which the central axis tilts with the center of the spherical body as a fulcrum, and an action of rotating in a circumferential direction around the central axis, and the operation device comprises a device which corrects a detected value of a tilting action based on a detected value of a rotation action.

11. A detection device which detects an action of a shaft member acting in response to an operation from outside, the detection device comprising:
- a hollow spherical body which has an outer shape formed in a substantially spherical shape and through which the shaft member is inserted;
- a magnet which is fixed inside the spherical body at a position linked with the action of the shaft member; and
- a magnetic field detection unit which is fixed at a position in the vicinity of a center of the spherical body and detects a magnetic field formed by the magnet,
- wherein the shaft member acts with respect to a virtual central axis which is parallel to a longitudinal direction and passes through the center of the spherical body,
- the inside of the spherical body is divided into a first magnetic field chamber and a second magnetic field chamber arranged in a central axis direction,
- the magnet comprises:
- a first magnet which is fixed to the shaft member inserted into the first magnetic field chamber; and
- a second magnet which is fixed in the second magnetic field chamber, and
- the magnetic field detection unit comprises:
- a first magnetic field sensor which detects a magnetic field in the first magnetic field chamber; and
- a second magnetic field sensor which detects a magnetic field in the second magnetic field chamber,
- the shaft member is capable of acting at least in an extending direction of the central axis, and
- the spherical body acts in the extending direction in conjunction with the action of the shaft member in the extending direction, and
- the detection device comprises:
- a movable member which moves in conjunction with an action of the spherical body in the extending direction;
- a fixed member which holds the movable member with the movable member being capable of acting; and
- a pressure sensor which is fixed to the fixed member and detects a pressing based on movement of the movable member.

12. The detection device according to claim 11, comprising, as the pressure sensor or separately from the pressure sensor, a tactile switch which receives the pressing based on the movement of the movable member.

13. The detection device according to claim 11, wherein
- the first magnet is arranged such that magnetic poles of the first magnet face a direction perpendicular to the central axis, and
- the second magnet is arranged such that magnetic poles of the second magnet face a direction parallel to the central axis.

* * * * *